United States Patent
Ichinose et al.

(10) Patent No.: US 7,210,731 B2
(45) Date of Patent: May 1, 2007

(54) DOOR APPARATUS

(75) Inventors: Mikio Ichinose, Yamanashi (JP); Fumihiro Yoneyama, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/396,562

(22) Filed: Apr. 4, 2006

(65) Prior Publication Data

US 2006/0175868 A1    Aug. 10, 2006

Related U.S. Application Data

(62) Division of application No. 10/817,930, filed on Apr. 6, 2004, now Pat. No. 7,052,073.

(30) Foreign Application Priority Data

| Apr. 7, 2003 | (JP) | 2003-103069 |
| Apr. 7, 2003 | (JP) | 2003-103071 |
| Apr. 7, 2003 | (JP) | 2003-103072 |
| Apr. 11, 2003 | (JP) | 2003-108349 |

(51) Int. Cl.
*B60J 5/06* (2006.01)

(52) U.S. Cl. ......................... 296/155; 49/360
(58) Field of Classification Search ............... 296/155; 49/324, 360
See application file for complete search history.

(56) References Cited

U.S. PATENT DOCUMENTS 6,477,806 B1 * 11/2002 Asada et al. ............... 49/169
6,659,539 B2    12/2003 Yogo et al.

FOREIGN PATENT DOCUMENTS

| JP | 60-199722 A | 10/1985 |
| JP | 10-273016 A | 10/1998 |
| JP | 2000-002046 A | 1/2000 |
| JP | 2001-152746 A | 6/2001 |
| JP | 2001-173296 A | 6/2001 |
| JP | 2001-288960 A | 10/2001 |
| JP | 3263805 B2 | 12/2001 |
| JP | 2002-194949 A | 7/2002 |
| JP | 2002-364243 A | 12/2002 |

* cited by examiner

*Primary Examiner*—Dennis H. Pedder
(74) *Attorney, Agent, or Firm*—Sughrue Mion, PLLC

(57) ABSTRACT

A door apparatus includes a door having a hole and configured to be slidable with respect to a vehicle body, a member configured to open and close the hole, a first detector configured to detect a position of the member relative to the hole to determine an openness of the hole, a second detector configured to detect a position of the door relative to the body, and a unit configured to be activated to project from one to another of the body and the door, so as to abut on the another such that the door is stopped from sliding in an opening direction, when the openness is greater than a threshold, and the position is between a full-closed position and a midway position.

2 Claims, 17 Drawing Sheets

DOOR APPARATUS

This is a divisional of application Ser. No. 10/817,930 filed Apr. 6, 2004 now U.S. Pat. No. 7,052,073. The entire disclosure of the prior application, application Ser. No. 10/817,930 is considered part of the disclosure of the accompanying divisional application and is hereby incorporated by reference.

BACKGROUND OF THE INVENTION

1) Field of the Invention

The present invention relates to a door apparatus.

2) Description of the Related Art

Some vehicles like vans ("one-box" cars) have sliding doors on a side of their bodies, the side parallel to a direction in which the vehicles travel. Such a sliding door usually has a window hole, which can be shut/opened by a window glass capable of freely moving up/down.

In such a vehicle, a full open latch unit and a full closure latch unit are provided between the vehicle body and the sliding door. The full open latch unit is configured to keep the sliding door at a full-open position relative to the vehicle body and the full closure latch unit is configured to keep the sliding door at a full-closed position relative to the vehicle body. Therefore, when the sliding door is at the full-closed position, for example, the sliding door will not slide inadvertently in an opening direction to which the sliding door is opened even if the vehicle body is inclined. Likewise, when the sliding door is at the full-open position, the sliding door will not slide inadvertently in a closing direction to which the sliding door is closed even if the vehicle body is inclined.

If the sliding door is slid in the opening direction with the window glass forgotten to be closed while a foreign object is inserted in the window hole, the foreign object may be caught between a window frame of the window hole and a pillar of the vehicle body. Consequently, damages to both the foreign object and the vehicle body may be caused.

Therefore, a middle stopper mechanism, which stops the sliding door at a position before the full-open position if an openness of the window hole or a degree to which the window hole is opened is greater than a predetermined threshold, even when the sliding door is slid in the door opening direction, may be provided to avoid the above problems, as disclosed in Japanese Patent Application Laid-Open No. 2001-173296 and Japanese Patent No. 3263805.

The middle stopper mechanism includes a middle striker provided at the vehicle body and a stopper member called a "pole" provided at the sliding door so as to be able to swing. When the openness of the window hole is equal to or less than the threshold, the stopper member is engaged with a hook member so as to be kept at a retracted position against a force applied by a forcing unit such as a spring and to not interfere with sliding of the sliding door.

If the openness of the window hole is greater than the threshold, the stopper member is released from being engaged with the hook member, so that the stopper member projects toward the vehicle body by the force applied by the forcing unit. As a result, when the sliding door is slid in the opening direction, the stopper member projected abuts on the middle striker to hinder the sliding door from sliding further. Therefore, even if the foreign object is stuck out through the window hole, the foreign object will not be caught between the window frame and the vehicle body.

The stopper member, however, is moved so as to project whenever the openness of the window hole exceeds the threshold. For example, the stopper member is moved so as to project even if the sliding door is already in the full-open position, and the foreign object cannot be put in/out through the window hole or the foreign object can be put in/out through the window hole but will not be caught between the window frame and the vehicle body.

There is no problem in the stopper member moving so as to be projected when the openness of the window hole exceeds the threshold for preventing the foreign object passing through the window hole from being caught. However, when the sliding door at the full-open position is slid in the closing direction, there is a problem in that a portion of the stopper member which is not originally designed as a portion to be abutted on the middle striker is abutted on the middle striker. Consequently, unpleasant noises are generated during the operation and sliding of the sliding door in the closing direction may be interfered. In particular, when the vehicle body is inclined, the sliding door may slide abruptly in the closing direction, making the above problem more significant.

Furthermore, when operating the sliding door, a user of the vehicle may not always stop the sliding door at the full-open position or the full-closed position. Particularly if the vehicle is long like the vans, a distance for which the sliding door is slided from the full-closed position to the full-open position is long. Therefore, the sliding door may be slided only by a small distance and stopped there (hereinafter referred to as being in a "half-open" state) for putting in/out a small baggage, for example.

When the sliding door is in the half-open state, the full open latch unit and the full closure latch unit of the vehicle do not function. Therefore, if the vehicle is inclined, the sliding door may possibly start moving due to the gravity.

When the sliding door is closed, a weather strip provided between the sliding door and the vehicle body along the entire circumference sufficiently functions as a pad so as to prevent generation of a loud noise even if the sliding door moves and reaches at a high speed the full-closed position.

However, when the sliding door is operated to open, the sliding door reaches the full-open position with a member called a full-open stopper colliding with a surface of the vehicle body and without the weather strip functioning as the pad. Accordingly, even if the pad such as rubber is provided between the full-open stopper and the surface of the vehicle body, it is difficult to prevent generation of a loud noise if the sliding door moving at a large speed reaches the full-open position. In a vehicle provided with a middle stopper mechanism, it is difficult to ensure sufficient strength with the stopper member. Not only the noise but also a damage to the middle stopper mechanism may thus be caused.

Further, since the stopper member is often provided at a lower portion of the sliding door, mud or water droplets may adhere on the forcing unit. Accordingly, the force applied by the forcing unit is likely to decrease by the adhesion of mud, or by freezing of the water droplets adhered. As a result, the stopper member cannot be fully projected toward the vehicle body, so that when the sliding door with the window hole open is slid in the opening direction, the sliding door may reach the full-open position because the stopper member cannot abut on the middle striker.

Moreover, even if the sliding door is restricted from reaching the full-open position, the sliding door is still able to slide in the opening direction, and getting in/out of passengers is still allowed. Therefore, if the user forgets to close the window glass, closes the sliding door, and leaves the vehicle, things left inside the vehicle may be stolen.

SUMMARY OF THE INVENTION

It is an object of the present invention to solve at least the problems in the conventional technology.

A sliding door apparatus according to an aspect of the present invention includes a sliding door having a window hole and configured to be slidable with respect to a vehicle body; an opening/closing member configured to open and close the window hole; a window hole openness detector configured to detect a position of the opening/closing member relative to the window hole so as to determine an openness of the window hole; a door position detector configured to detect a position of the sliding door relative to the vehicle body; and a slide restricting unit configured to be activated to project from one to another one of the vehicle body and the sliding door, so as to abut on the another one such that the sliding door is stopped from sliding in a direction toward which the sliding door is opened relatively to the vehicle body, when the openness determined by the window hole openness detector is greater than a threshold, and the position of the sliding door is detected to be between a full-closed position and a midway position.

A sliding door apparatus according to another aspect of the present invention includes a sliding door configured to be slidable with respect to a vehicle body; a door speed detector configured to detect a speed of the sliding door at least when the sliding door slides in a direction toward which the sliding door is opened; and a braking unit configured to brake down the sliding door when the speed detected is greater than a threshold.

A sliding door apparatus according to still another aspect of the present invention includes a sliding door configured to be slidable with respect to a vehicle body and having a window hole configured to be opened/closed; a restricting unit having an abutting portion configured to advance from and retract back to the sliding door to and from the vehicle body and to restrict the sliding door from fully opening when the abutting portion advances so as to abut on a predetermined portion of the vehicle body; a forcing unit configured to apply a force on the abutting portion so as to keep the abutting portion retracted from the vehicle body; and a driving unit configured to drive the abutting portion such that the abutting portion advances to the vehicle body against the force applied by the forcing unit when an openness of the window hole is greater than a threshold.

A vehicle door apparatus according to still another aspect of the present invention includes a door having a window hole configured to be opened/closed; and a door closure preventing unit configured to cancel closure of the door, if the door is closed with respect to the vehicle body when the window hole is open.

A vehicle door apparatus according to still another aspect of the present invention includes a door having a window hole configured to be opened/closed; and a door closure preventing unit configured to prevent the door from being closed if the door is moved to be closed with respect to the vehicle body when the window hole is open.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1A:
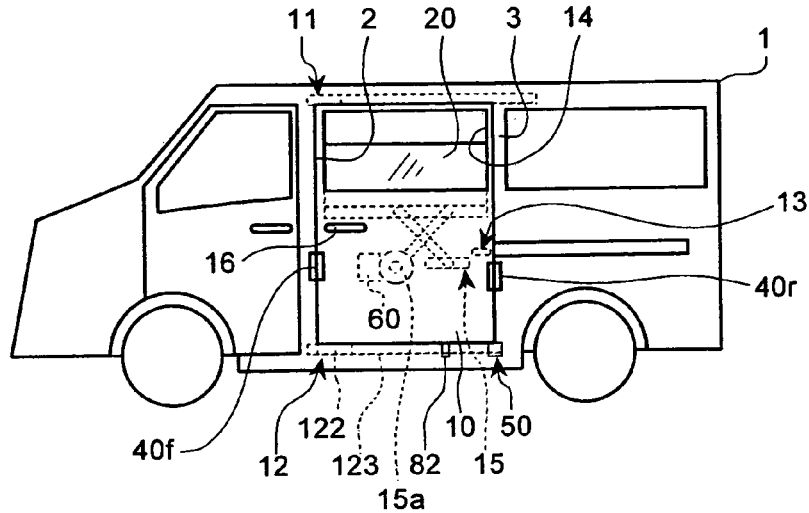
FIG. 1A is a side view of a four-wheeled automobile having a sliding door apparatus according to a first embodiment of the present invention, with a sliding door fully closed.
Figure 1B:
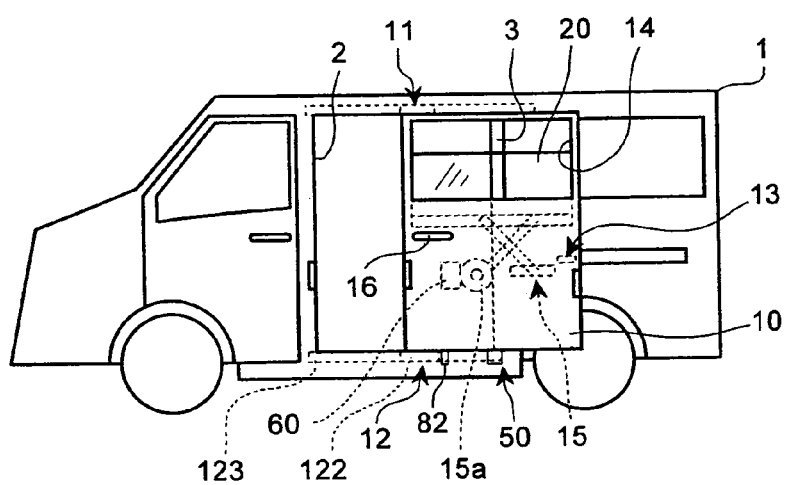
FIG. 1B is a side view of the automobile with a slide restricting unit activated.
Figure 1C:
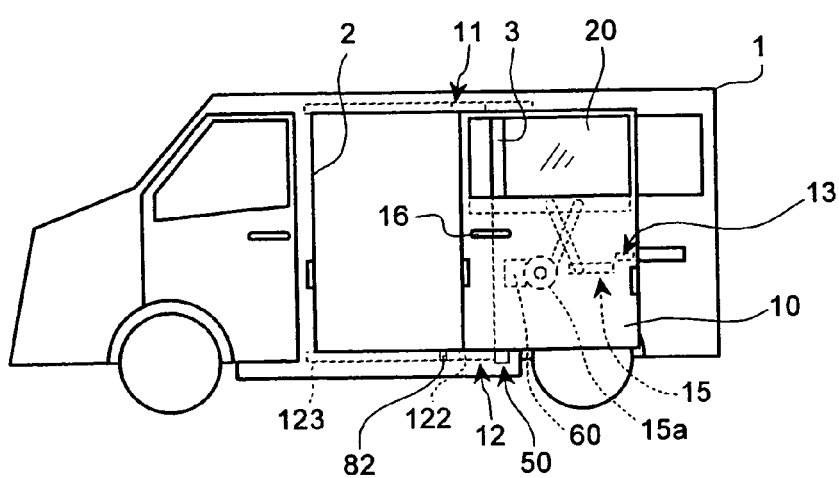
FIG. 1C is a side view of the automobile with the sliding door fully opened.

FIG. 1A to FIG. 1C are schematics of a four-wheeled automobile that employs a sliding door apparatus according to a first embodiment of the present invention. The automobile has a vehicle body 1 of a one-box type, an entrance opening 2, which allows passengers to get on or off the vehicle, disposed substantially at a center of a side of the vehicle body 1, and a sliding door 10 provided at the entrance opening 2.

Figure 2A:
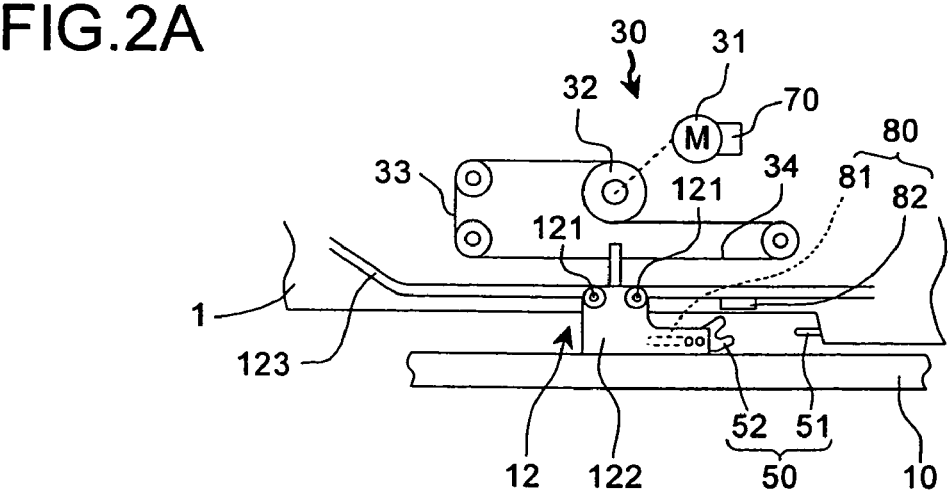
FIG. 2A is a plane view of parts of the automobile with the sliding door slightly opened.
Figure 2B:
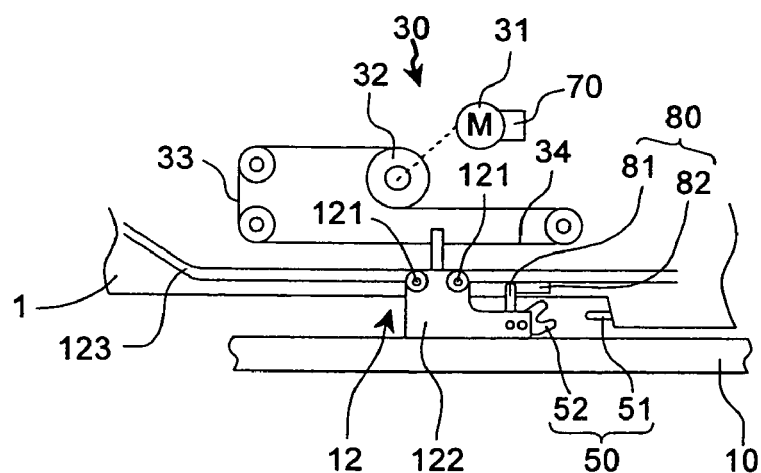
FIG. 2B is a plane view of the automobile with the slide restricting unit activated.
Figure 2C:
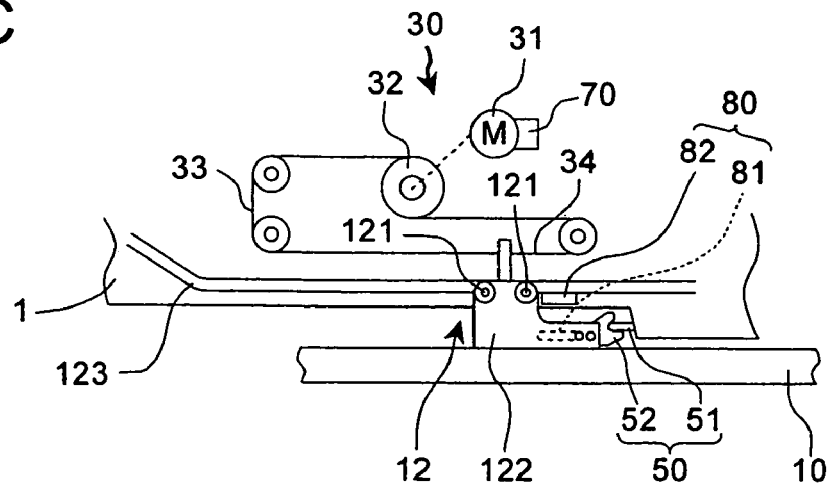
FIG. 2C is a side view of the automobile with the sliding door fully opened.

The sliding door 10 is slidably provided on the side of the vehicle body 1 via an upper guiding unit 11 provided at an upper portion of the vehicle body 1, a lower guiding unit 12 at a lower portion of the vehicle body 1, and a center guiding unit 13 at a center portion of the vehicle body 1. The sliding door 10 shuts the entrance opening 2 when slid furthest toward a front of the vehicle body 1 as shown in FIG. 1A (hereinafter, "a closed position"). The sliding door 10 opens the entrance opening 2 when slid furthest toward a back of the vehicle body 1 as shown in FIG. 1C (hereinafter, "a full-open position"). These guiding units are provided with a support frame 122 having a running roller 121, which are provided at the sliding door 10 and with a guide rail 123 for guiding the running roller 121, which is provided on the vehicle body 1, as shown in FIG. 2A to FIG. 2C.

The sliding door 10 includes a window glass 20 serving as an opening/closing member as shown in FIG. 1. The window glass 20 is for opening and closing a window hole 14 provided through the slide door 10. A degree to which the window hole 14 is opened or an openness of the window hole 14 can be adjusted by operation of a window regulator mechanism 15 provided between the window glass 20 and the sliding door 10. A so-called power window having a regulator switch (not shown) for operating the window regulator mechanism 15 may be employed. The window glass 20 may be moved so as to be closed by rotation of a window motor 15a in a first direction with an UP operation of the regulator switch, and so as to be opened by rotation of the window motor 15a in a second direction with a DOWN operation of the regulator switch.

Between the sliding door 10 and the vehicle body 1, an automatic sliding unit 30, full closure latch units 40f and 40r, and a full open latch unit 50 are provided.

The automatic sliding unit 30 is configured to activate an actuator in response to an operation made through a door switch provided at a driver's seat or a passenger's seat in the vehicle, or at a door handle 16 or a key, so as to allow the sliding door 10 to slide by an action of the actuator. More specifically, a drum 32 is provided on a driving axis of a sliding motor 31 serving as the actuator, and the drum 32 and the support frame 122 are linked by a door-closing wire 33 for moving the sliding door 10 forward and a door-opening wire 34 for moving the sliding door 10 backward. The sliding door 10 is slid in an opening direction to which the sliding door is opened or in a closing direction to which the sliding door is closed, in response to normal rotation/reverse rotation of the sliding motor 31 transmitted to the support frame 122 through the wires 33 and 34.

The full closure latch units 40f and 40r are for keeping the sliding door 10 at the full-closed position, and are provided at two positions at a front and a back, one of the positions between a front edge portion of the sliding door 10 and the vehicle body 1 and another of the positions between a rear edge portion of the sliding door 10 and the vehicle body 1. The full open latch unit 50 is for keeping the sliding door 10 at the full-open position, and is provided between the support frame 122 of the lower guiding unit 12 and the vehicle body 1, as shown in FIG. 2, for example. In the first embodiment, the full closure latch units 40f and 40r, and the full open latch unit 50 both include a striker 51 disposed at the vehicle body 1 and a latch 52 disposed at the sliding door 10, so that the sliding door 10 is kept at a desired position in relation to the vehicle body 1 when the striker 51 and the latch 52 are meshed with each other, as is representatively shown in FIG. 2. The meshing engagements between the striker 51 and the latch 52 of these full open latch unit 50 and full closure latch units 40f and 40r can be released by operating the door switch so as to activate a release actuator (not shown). Of course, the meshing engagements between the striker 51 and the latch 52 in these full open latch unit 50 and full closure latch units 40f and 40r may be released by operating the door handle 16 provided inside/outside the sliding door 10.

As shown in FIG. 1 and FIG. 2, the sliding door 10 also has a window hole openness detector 60, as well as a door position detector 70 and a slide restricting unit 80 between the sliding door 10 and the vehicle body 1.

The window hole openness detector 60 detects the openness of the window hole 14 opened and closed as the window glass 20 is moved. In the first embodiment, the openness of the window hole 14 is detected by calculating an amount and a direction of rotation of the window motor 15a based on an output pulse from a rotary encoder (not shown) of the window motor 15a as shown in FIG. 1. A result of the detection is sent to an open/close controller 100.

The door position detector 70 is for detecting a position of the sliding door 10 relative to the vehicle body 1. As shown in FIG. 2, in the first embodiment, the door position detector 70 detects the position by calculating a rotation amount and a rotation direction of the sliding motor 31 based on an output pulse from a rotary encoder (not shown) provided at the sliding motor 31. A result of the detection of the door position detector 70 is given to the open/close controller 100 as will be described later.

The slide restricting unit 80 restricts, when activated before the sliding door 10 reaches the full-open position, sliding of the sliding door 10 in the opening direction relative to the vehicle body 1. In the first embodiment, the slide restricting unit 80 employs a structure shown in FIGS. 2A to FIG. 2C. A stopper member 81 is pivotably provided at the supporting frame 122 of the lower guiding unit 12, and an abutting portion 82 is provided at the vehicle body 1. When the slide restricting unit 80 is not activated, the stopper member 81 is kept at a retracted position as shown in FIGS. 2A and 2C so that the stopper member 81 does not interfere with the sliding of the sliding door 10. On the other hand, when the slide restricting unit 80 is activated as shown in FIG. 2B, the stopping member 81 is held at an advanced position toward the vehicle body 1 by an actuator (not shown). Accordingly, when the sliding door 10 is slid in the opening direction, the stopper member 81 abuts on the abutting portion 82 of the vehicle body 1, so as to prevent the sliding door 10 from further sliding. The position at which the stopper member 81 and the abutting portion 82 abut each other (hereinafter "midway position"), as shown in FIG. 1B is set so that a safe distance between a front side frame of the window hole 14 and a C pillar 3 of the vehicle body 1 is ensured before the sliding door 10 reaches the full-open position.

Figure 3:
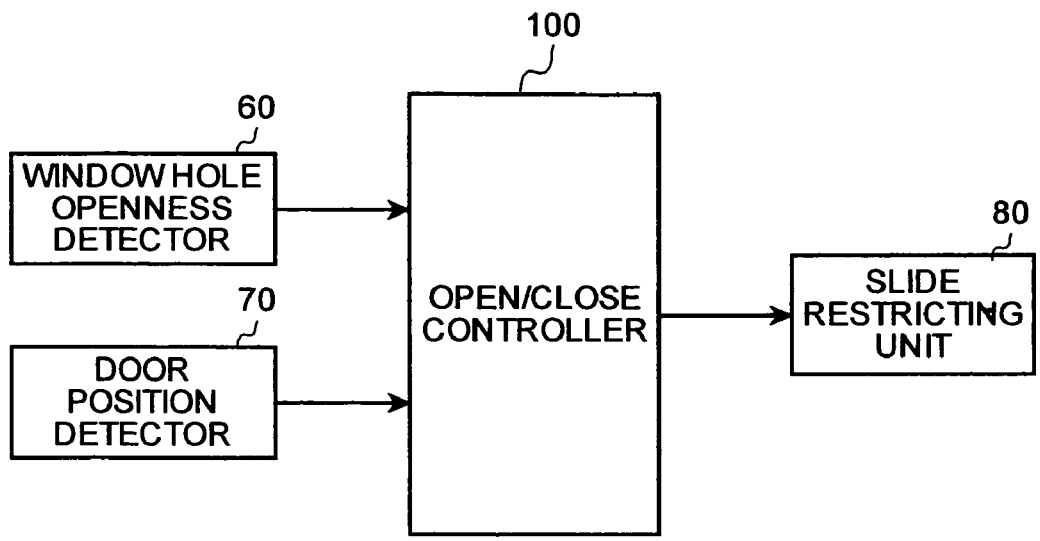
FIG. 3 is a block diagram of an open/close control system of the sliding door apparatus in the automobile shown in FIGS. 1A to 1C.

FIG. 3 is a block diagram of an open/close control system of the sliding door apparatus. The open/close controller 100 controls operation of the slide restricting unit 80 based on the results of the detection by the window hole openness detector 60 and the door position detector 70.

Figure 4:
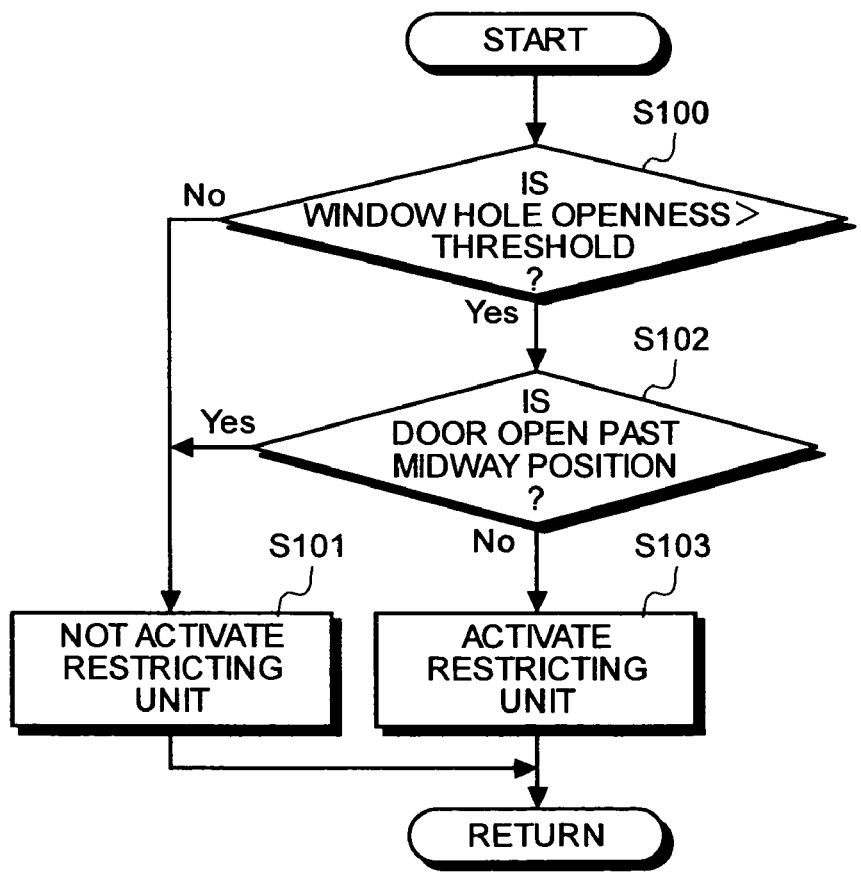
FIG. 4 is a flow chart of processes executed by an open/close controller shown in FIG. 3.

FIG. 4 is a flowchart of processes executed by the open/close controller 100. The open/close controller 100 constantly monitors the result of the detection by the window hole openness detector 60 and determines whether the openness of the window hole 14 exceeds a threshold (step S100). The threshold is a criterion for the determination, and is preferably as small as possible. The threshold may be 150 mm, for example.

If the openness of the window hole 14 detected by the window hole openness detector 60 is 150 mm or less, the open/close controller 100 keeps the slide restricting unit 80 non-activated (step S101). When the slide restricting unit 80 is not activated, since the stopper member 81 is held at the retracted position, the stopper member 81 and the abutting portion 82 do not abut on each other wherever the sliding door 10 is slid to. Therefore, as shown in FIG. 2A, when the sliding door 10 is in the fully-closed position, by disengaging the striker 51 and the latch 52 of the full closure latch units 40f and 40r, it is possible to slide the sliding door 10 to the full-open position without any trouble. As a result, the entrance opening 2 of the vehicle body 1 is opened widely as shown in FIG. 2C, and getting on and off the vehicle by passengers and taking baggages in and out the vehicles are facilitated.

On the other hand, if the openness of the window hole 14 detected by the window hole openness detector 60 is greater than 150 mm, the open/close controller 100 detects a position of the sliding door 10 relative to the vehicle body 1 via the door position detector 70 (step S102).

When the sliding door 10 has already passed the midway position and is before the full-open position, that is, when the window hole 14 is open but a foreign object cannot be put in/out through the open area, or when a foreign object cannot be caught between the open area and the vehicle body 1 even though the foreign object may be put in/out through the open area, the open/close controller 100 proceeds the flow to step S101 and keeps the slide restricting unit 80 inactivated. Accordingly, it becomes possible to slide the sliding door 10 without any trouble as is the above case. The entrance opening 2 can be widely opened by keeping the sliding door 10 at the full-open position, so that getting on/off of passengers and putting in/out of baggage are facilitated. On the other hand, when the sliding door 10 is slid in the closing direction, the stopper member 81 and the abutting portion 82 will not abut on each other, so that the sliding door 10 can be brought to the full-closed position without any interference to the operation and unpleasant noises during the operation.

When the sliding door 10 is between the full-closed position and the midway position at step S102, the open/close controller 100 switches the slide restricting unit 80 activated (step S103). As described above, when the slide restricting unit 80 is activated, the stopper member 81 is kept advanced relative to the vehicle body 1. Therefore, when the sliding door 10 is slid in the opening direction, the stopper member 81 abuts on the abutting portion 82 of the vehicle body 1, and the sliding door 10 is stopped from sliding at the midway position with a certain distance kept between the front side frame of the opened window hole 14 and the C pillar 3 of the vehicle body 1 as shown in FIG. 2B. As a result, even if there is the foreign object passing through the open area of the window hole 14, it is possible to prevent the foreign object from being caught between the window frame and the vehicle body 1.

After the sliding door 10 has stopped at the midway position, when the window glass 20 is closed by the UP operation of the regulator switch so that the openness becomes equal to or less than 150 mm, the flow proceeds to step S101 from step S100, such that the sliding door 10 is allowed to slide to the full-open position again.

The open/close controller 100 repeatedly executes the steps described above, activating the slide restricting unit 80 to restrict the sliding door 10 from sliding in the opening direction only when the openness of the window hole 14 is greater than the predetermined threshold and the sliding door 10 is between the full-closed position and the midway position. In other words, if the foreign object cannot be put in/out through the window hole 14, for example, when the sliding door 10 is already at the full-open position, or if the foreign object cannot be caught between the window frame and the vehicle body 1 even if the foreign object may be put in/out through the window hole 14, the stopper member 81 will not move to be stuck out.

Therefore, for example, when the window hole 14 is largely opened when the sliding door 10 is at the full-open position, and then the sliding door 10 is slid into the closing direction, the stopper member 81 and the abutting portion 82 will not abut on each other, so that unpleasant noises will not be generated as the sliding door is operated, and closing of the sliding door 10 will not be interfered.

In the first embodiment, although the sliding door apparatus for opening and closing the entrance opening 2 disposed substantially at the center of the side of the vehicle body 1 of the one box type has been described as an example, the sliding door apparatus may be utilized in opening/closing an opening provided in any other types of vehicles. Further, the sliding door apparatus may not be necessarily provided on the side of the vehicle. Furthermore, although the window glass 20 that opens and closes by the rotation of the window motor 15a in response to the operation of the regulator switch has been described as an example of the opening/closing member, the opening/closing member is not necessarily a glass, or driven by a motor. The opening/closing member may be any other members that can open and close the window hole 14 of the sliding door 10, and the opening/closing member is not necessarily opened/closed in the up-and-down direction. Moreover, although the embodiment in which the window hole openness detector 60 and the door position detector 70 carry out detections based on the output pulses from the rotary encoder (not shown) has been described, the principle of the detections and the specific structures of the detectors are not limited to those of the embodiment.

In addition, the threshold of the window hole openness detector 60 is set at 150 mm in the first embodiment, but the threshold may be set at any arbitrary value. For example, by setting the threshold at 0 mm, it is possible to more infallibly prevent any foreign objects from being caught.

Figure 5A:
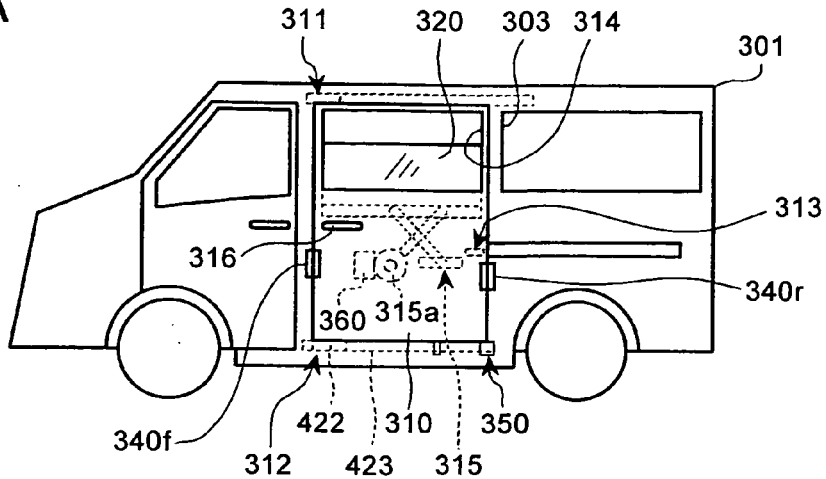
FIG. 5A is a side view of a four-wheeled automobile having a sliding door apparatus according to a second embodiment of the present invention with a sliding door fully closed.
Figure 5B:
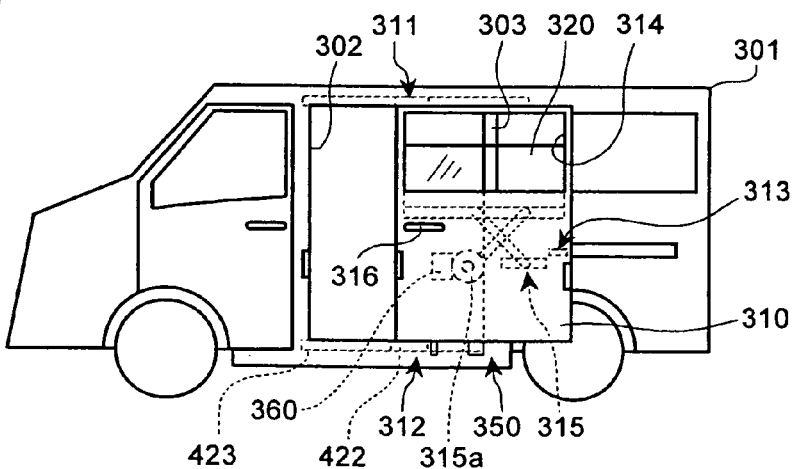
FIG. 5B is a side view of the automobile in FIG. 5A with a slide restricting unit activated.
Figure 5C:
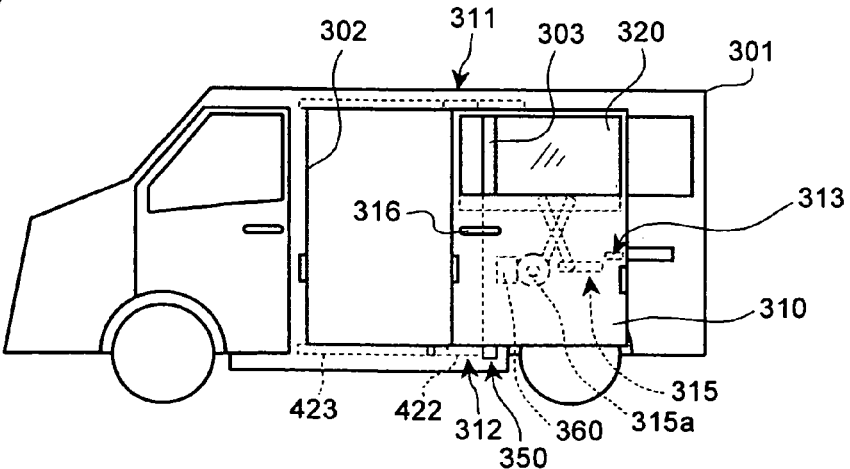
FIG. 5C is a side view of the automobile in FIG. 5A with the sliding door fully opened.

FIG. 5A to FIG. 5C are schematics of a four-wheeled automobile that employs a sliding door apparatus according to a second embodiment of the present invention. The automobile has a vehicle body 301 of a one-box type, an entrance opening 302, which allows passengers to get on or off the vehicle, disposed substantially at a center of a side of the vehicle body 301, and a sliding door 310 provided at the entrance opening 302.

Figure 6A:
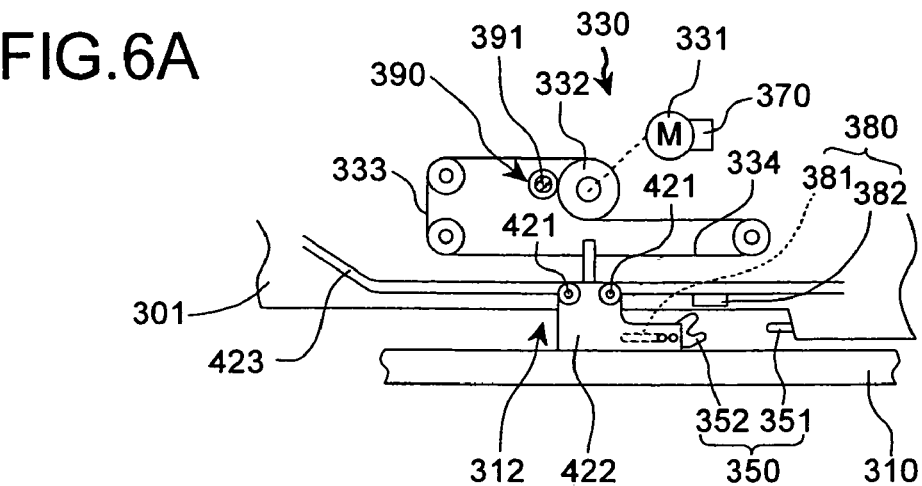
FIG. 6A is a plan view of parts of the automobile shown in FIGS. 5A to 5C with the sliding door slightly opened.
Figure 6B:
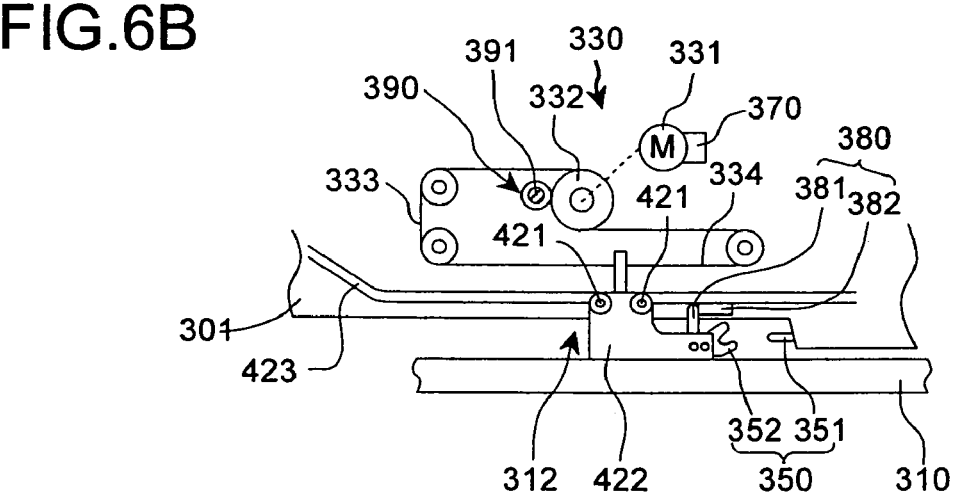
FIG. 6B is a plane view of the automobile with the slide restricting unit activated.
Figure 6C:
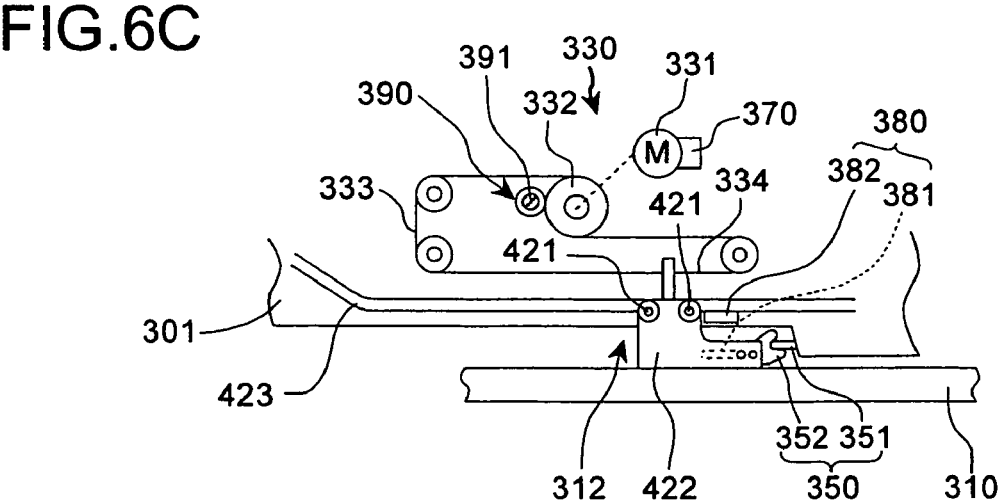
FIG. 6C is a plane view of the automobile with the sliding door fully opened.

The sliding door 310 is slidably provided on the side of the vehicle body 301 via an upper guiding unit 311 provided at an upper portion of the vehicle body 301, a lower guiding unit 312 at a lower portion of the vehicle body 301, and a center guiding unit 313 at a center portion of the vehicle body 301. The sliding door 310 shuts the entrance opening 302 when slid furthest toward a front of the vehicle body 301 as shown in FIG. 5A (hereinafter, "a closed position"). The sliding door 310 opens the entrance opening 302 when slid furthest toward a back of the vehicle body 301 as shown in FIG. 5C (hereinafter, "a full-open position"). These guiding units are provided with a support frame 422 having a running roller 221, which are provided at the sliding door 310 and with a guide rail 423 for guiding the running roller 421, which is provided on the vehicle body 301, as shown in FIG. 6A to FIG. 6C.

The sliding door 310 includes a window glass 320 serving as an opening/closing member. The window glass 320 is for opening and closing a window hole 314 provided through the slide door 310. A degree to which the window hole 314 is opened can be adjusted by operation of a window regulator mechanism 315 provided between the window glass 320 and the sliding door 310. A so-called power window having a regulator switch (not shown) for operating the window regulator mechanism 315 may be employed. The window glass 320 may be moved so as to be closed by rotation of a window motor 315a in a first direction with an UP operation of the regulator switch, and so as to be opened by rotation of the window motor 315a in a second direction with a DOWN operation of the regulator switch.

Between the sliding door 310 and the vehicle body 301, an automatic sliding unit 330, full closure latch units 340f and 340r, and a full open latch unit 350 are provided.

The automatic sliding unit 330 is configured to activate an actuator in response to an operation made through a door switch provided at a driver's seat or a passenger's seat in the vehicle, or at a door handle 316 or a key, so as to allow the sliding door 310 to slide by an action of the actuator. More specifically, a drum 332 is provided on a driving axis of a sliding motor 331 serving as the actuator, and the drum 332 and the support frame 422 are linked by a door-closing wire 333 for moving the sliding door 310 forward and a door-opening wire 334 for moving the sliding door 310 backward. The sliding door 310 is slid in an opening direction to which the sliding door is opened or in a closing direction to which the sliding door is closed, in response to normal rotation/reverse rotation of the sliding motor 331 transmitted to the support frame 422 through the wires 333 and 334.

The full closure latch units 340f and 340r are for keeping the sliding door 310 at the full-closed position, and are provided at two positions at a front and a back, one of the positions between a front edge portion of the sliding door 310 and the vehicle body 301 and another of the positions between a rear edge portion of the sliding door 310 and the vehicle body 301. The full open latch unit 350 is for keeping the sliding door 310 at the full-open position, and is provided between the support frame 422 of the lower guiding unit 312 and the vehicle body 301, as shown in FIG. 6, for example. In the second embodiment, the full closure latch units 340f and 340r, and the full open latch unit 350 both include a striker 351 disposed at the vehicle body 301 and a latch 352 disposed at the sliding door 310, so that the sliding door 310 is kept at a desired position in relation to the vehicle body 301 when the striker 351 and the latch 352 are meshed with each other, as is representatively shown in FIG. 6. The meshing engagements between the striker 351 and the latch 352 of these full open latch unit 350 and full closure latch units 340f and 340r can be released by operating the door switch so as to activate a release actuator (not shown). Of course, the meshing engagements between the striker 351 and the latch 352 in these full open latch unit 350 and full closure latch units 340f and 340r may be released by operating the door handle 316 provided inside/outside the sliding door 310.

As shown in FIG. 5 and FIG. 6, the sliding door 310 also has a window hole openness detector 360, as well as a door detector 370, a slide restricting unit 380, and a braking unit 390 between the sliding door 310 and the vehicle body 301.

The window hole openness detector 360 detects the openness of the window hole 314 opened and closed as the window glass 320 is moved. In the second embodiment, the openness of the window hole 314 is detected by calculating an amount and a direction of rotation of the window motor 315a based on an output pulse from a rotary encoder (not shown) of the window motor 315a as shown in FIG. 5. A result of the detection is sent to an open/close controller 400.

The door detector 370 is for detecting a position and a speed of the sliding door 310 relative to the vehicle body 301. As shown in FIG. 6, in the second embodiment, the door detector 370 detects the position and the speed by calculating a rotation amount and a rotation direction of the sliding motor 331 based on an output pulse from a rotary encoder (not shown) provided at the sliding motor 331. A result of the detection of the door detector 370 is given to the open/close controller 400 as will be described later.

The slide restricting unit 380 restricts, when activated before the sliding door 310 reaches the full-open position, sliding of the sliding door 310 in the opening direction relative to the vehicle body 301. In the second embodiment, the slide restricting unit 380 employs a structure shown in FIG. 6A to FIG. 6C. A stopper member 381 is pivotably provided at the supporting frame 422 of the lower guiding unit 312, and an abutting portion 382 is provided at the vehicle body 301. When the slide restricting unit 380 is not activated, the stopper member 381 is kept at a retracted position as shown in FIGS. 6A and 6C so that the stopper member 381 does not interfere with the sliding of the sliding door 310. On the other hand, when the slide restricting unit 380 is activated as shown in FIG. 6B, the stopping member 381 is held at an advanced position toward the vehicle body 301 by an actuator (not shown). Accordingly, when the sliding door 310 is slid in the opening direction, the stopper member 381 abuts on the abutting portion 82 of the vehicle body 1, so as to prevent the sliding door 310 from further sliding. The position at which the stopper member 381 and the abutting portion 382 abut each other (hereinafter "midway position"), as shown in FIG. 5B is set so that a safe distance between a front side frame of the window hole 314 and a C pillar 303 of the vehicle body 301 is ensured before the sliding door 310 reaches the full-open position.

The braking unit 390 is for braking the sliding door 310. In the second embodiment, the braking unit 390 is connected with the drum 332 of the automatic sliding unit 330 via an electromagnetic clutch 391, applies a load on rotation of the drum 332 when the electromagnetic clutch 391 is brought into a linked state, and brakes the sliding door 310 via the door-closing wire 333 and the door-opening wire 334.

Figure 7:
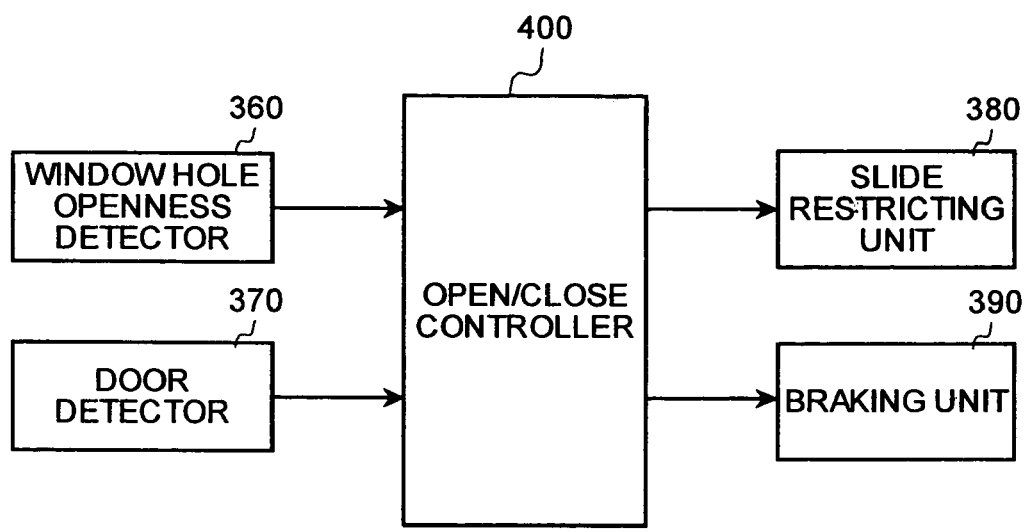
FIG. 7 is a block diagram of an open/close control system of the sliding door apparatus in the automobile shown in FIGS. 5A to 5C.

FIG. 7 is a block diagram of an open/close control system of the sliding door apparatus. The open/close controller 400 controls operation of the slide restricting unit 380 and the braking unit 390 based on the results of the detection by the window hole openness detector 360 and the door detector 370.

Figure 8:
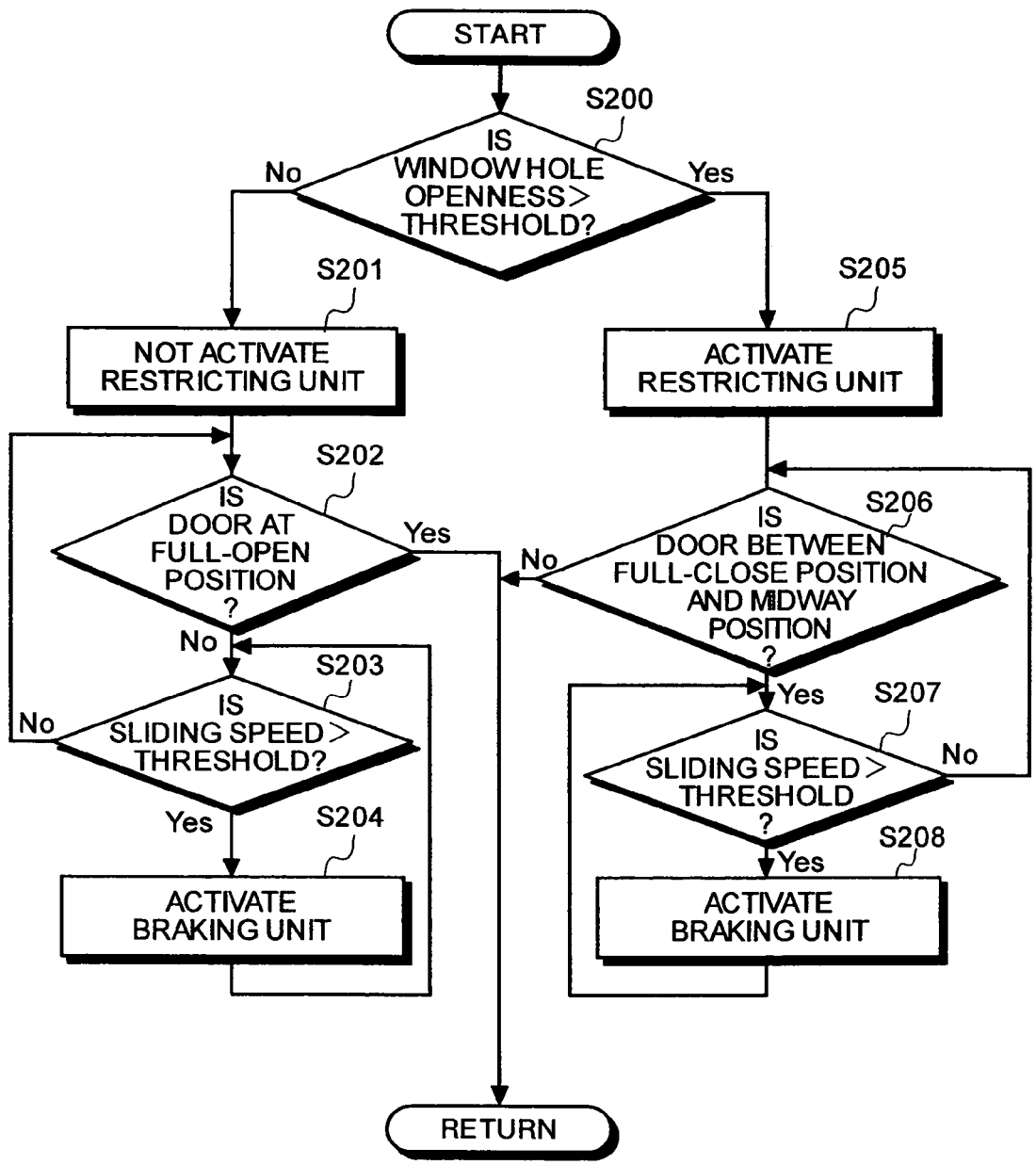
FIG. 8 is a flow chart of processes executed by an open/close controller shown in FIG. 7.

FIG. 8 is a flowchart of processes executed by the open/close controller 400. The open/close controller 400 constantly monitors the result of the detection by the window hole openness detector 360 and determines whether the openness of the window hole 314 exceeds a threshold (step S200). The threshold is a criterion for the determination, and is preferably as small as possible. The threshold may be 150 mm, for example.

If the openness of the window hole 314 detected by the window hole openness detector 360 is 150 mm or less, the open/close controller 400 keeps the slide restricting unit 380 non-activated (step S201). When the slide restricting unit 380 is not activated, since the stopper member 381 is held at the retracted position, the stopper member 381 and the abutting portion 382 do not abut on each other wherever the sliding door 310 is slid to. Therefore, as shown in FIG. 6A, when the sliding door 310 is in the full-closed position, by disengaging the striker 351 and the latch 352 of the full closure latch units 340f and 340r, it is possible to slide the sliding door 310 to the full-open position without any trouble. As a result, the entrance opening 302 of the vehicle body 301 is opened widely as shown in FIG. 6C, and getting on and off the vehicle by passengers and taking baggage in and out the vehicles are facilitated.

In the meantime, the open/close controller 400 monitors the position of the sliding door 310 through the door detector 370 (step S202), and determines whether the speed of the sliding door 310 detected by the door detector 370 is greater than a predetermined threshold until the sliding door 310 reaches the full-open position (step S203).

When the speed of the sliding door 310 is equal to or less than the threshold, the flow returns to step S202 without executing the processes described below. When the speed of the sliding door 310 is greater than the threshold, the braking unit 390 is activated until the speed of the sliding door 310 decreases to a value equal to or less than the threshold (step S204). Therefore, even if the sliding door 310 is half-open when the vehicle is inclined, for example, the sliding door 310 will not start moving at a high speed to immediately reach the full-open position and generate a loud noise.

When it is detected that the sliding door 310 has reached the full-open position at step S202, the flow is ended.

If the openness of the window hole 314 is greater than 150 mm at step S200, the open/close controller 400 switches the slide restricting unit 380 to an activated state (step S205). Once the slide restricting unit 380 is brought into the activated state, the stopper member 381 is held at the advanced position toward the vehicle body 301. Accordingly, when the sliding door 310 is slid in the opening direction, the stopper member 381 abuts on the abutting portion 382 of the vehicle body 301. As a result, as shown in FIG. 6B, the sliding door 310 is stopped from sliding at the midway position with a predetermined distance between the front side frame of the opened window hole 314 and the C pillar 303 of the vehicle body 301. In this manner, even if a foreign object is present through the open area of the window hole 314, it is possible to prevent the foreign object from being caught between the window frame and the vehicle body 301.

In the meantime, the open/close controller 400 monitors the position of the sliding door 310 through the door detector 370 (step S206), and determines whether the speed of the sliding door 310 detected by the door detector 370 is greater than a predetermined threshold until the sliding door 310 reaches the midway position (step S207).

When the speed of the sliding door 310 is equal to or less than the threshold, the flow returns to step S206 without executing the steps described below. When the speed of the sliding door 310 is greater than the threshold, the braking unit 390 is activated until the speed of the sliding door 310 is decreased to a value equal to or less than the threshold (step S208). Therefore, even if the sliding door 310 is half-open when the vehicle is inclined for example, the sliding door 310 will not start moving at a high speed to immediately reach the midway position, generate a loud noise, and damage the slide restricting unit 380.

When it is detected that the sliding door 310 has reached the midway position at step S206, that is, when it is detected that the sliding door 310 is stopped at the midway position by the slide restricting unit 380, the flow is ended.

The open/close controller 400 then repeatedly executes the above steps, such that sliding of the sliding door 310 in the opening direction is restricted by activating the slide restricting unit 380 when the openness of the window hole 314 is greater than the predetermined threshold. Accordingly, even if a foreign object is put out through the window hole 314, it is possible to prevent the foreign object from being caught between the window frame and the vehicle body 301, so that the sliding door 310 is more user-friendly. Additionally, when the sliding door 310 starts moving at a high speed, the braking unit 390 is activated so as to reduce the speed. Accordingly, it is possible to infallibly prevent generation of noises and damages to the slide restricting unit 380 when the sliding door 310 is stopped half-open.

In the second embodiment, although the sliding door apparatus for opening and closing the entrance opening 302 disposed substantially at the center of the side of the vehicle body 301 of the one box type has been described as an example, the sliding door apparatus may be utilized in opening/closing an opening provided in any other types of vehicles. Further, the sliding door apparatus may not be necessarily provided on the side of the vehicle. Furthermore, although the window glass 320 that opens and closes by the rotation of the window motor 315a in response to the operation of the regulator switch has been described as an example of the opening/closing member, the opening/closing member is not necessarily a glass, or driven by a motor. The opening/closing member may be any other members that can open and close the window hole 314 of the sliding door 310, and the opening/closing member is not necessarily opened/closed in the up-and-down direction. Moreover, although the embodiment in which the window hole openness detector 360 and the door detector 370 carry out detections based on the output pulses from the rotary encoder (not shown) has been described, the principle of the detections and the specific structures of the detectors are not limited to those of the embodiment.

In addition, although the embodiment in which the slide door apparatus having the slide restricting unit 380 has been described, the sliding door apparatus does not necessarily have the slide restricting unit 380. What is more, the threshold of 150 mm has been used in the second embodiment, but the threshold may be set at any arbitrary value. For example, by setting the threshold at 0 mm, it is possible to more infallibly prevent any foreign objects from being caught.

Figure 9:
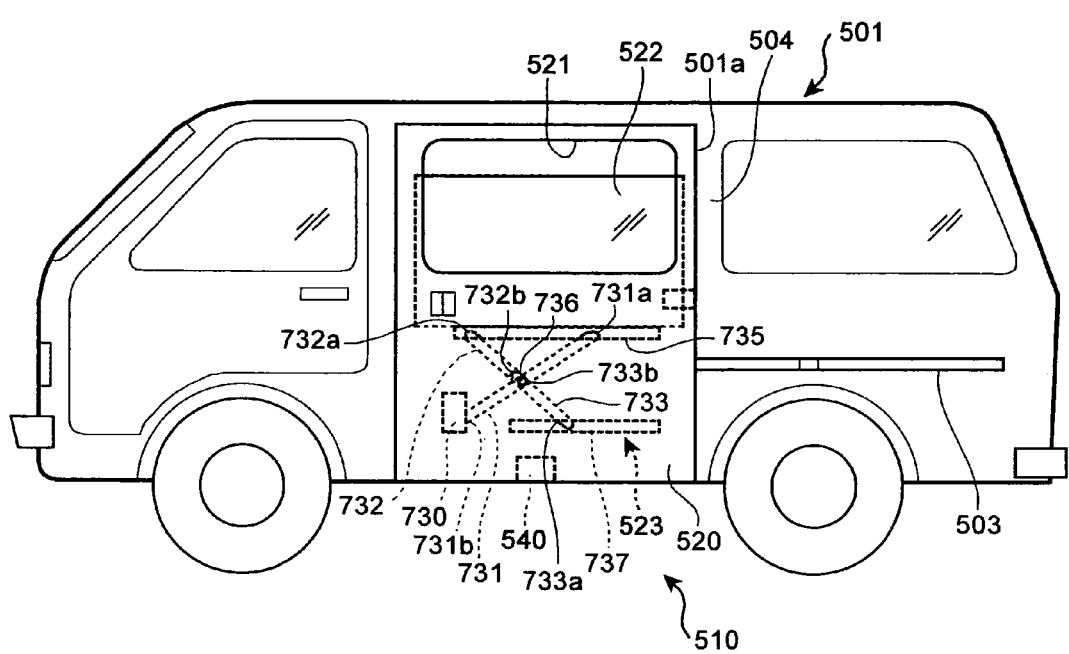
FIG. 9 is a side view of a vehicle having a sliding door apparatus according to a third embodiment of the present invention.

FIG. 9 is a side view of a vehicle that adopts a sliding door apparatus according to a third embodiment of the present invention. In FIG. 9, a sliding door apparatus 510 includes a sliding door 520 and a restricting unit 540.

The sliding door 520 is disposed on a side of a vehicle body 501 of a four-wheeled automobile such as a "one-box" van. This sliding door 520 is capable of sliding along a fore-and-aft direction of the vehicle body 501. To be more specific, the sliding door 520 is engaged with a rail 503 provided approximately parallel to the fore-and-aft direction of vehicle body 501 on the side of the vehicle body 501. The sliding door 520 slides along the rail 503 in the fore-and-aft direction, so as to open/close an opening 501a on the side of the vehicle body 501. In the illustrated example, the opening 501a is closed, that is, the sliding door 520 is fully closed.

The sliding door 520 includes a window hole 521 at an upper portion of the sliding door 520. The window hole 521 can be opened/closed by up-and-down movement of a window glass 522. In the present specification, the window hole 521 is in a closed state when the window glass 522 is at the upper dead end and in an open state when the window glass 522 has moved down by a predetermined amount from the upper dead end. The up-and-down movement of the window glass 522 is achieved by a window regulator 523. A power window regulator of an X-arm type is used as the window regulator 523 in the second embodiment.

The window regulator 523 includes a lifting arm 731, a first movable arm 732, and a second movable arm 733. The lifting arm 731 has a roller (not shown) at a distal end portion 731*a* of the lifting arm 731 and an arm driving unit (displacing mechanism) 730 at a proximal end portion 731*b* of the lifting arm 731. The roller is engaged with a guide portion (not shown) of a first supporting member 735 fixed at a lower end of the window glass 522 so as to be movable in a horizontal direction. The arm driving unit 730 has a motor inside, and is configured to swing the lifting arm 731. In a middle portion of the lifting arm 731, a spindle 736 is rotatably provided so as to pass through the lifting arm 731.

The first movable arm 732 has a distal end portion 732*a* with a roller (not shown) and a proximal end portion 732*b* fixed to the spindle 736. The roller is engaged with the guide portion of the first supporting member 735 so as to be movable in the horizontal direction. Therefore, the first movable arm 732 is able to swing about the axial center of the spindle 736.

The second movable arm 733 has a distal end portion 733*a* with a roller (not shown) and a proximal end portion 733*b* fixed to the spindle 736. The roller is disposed on an inner panel (not shown) of the sliding door 520 and is engaged with a guide portion (not shown) of a second supporting member 737 which is parallel with the first supporting member 735, so as to be movable in the horizontal direction. Therefore, the second movable arm 733 is able to swing about the axial center of the spindle 736.

That is, the window regulator 523 moves up/down the window glass 522 by displacing the first supporting member 735 in a direction of leaving or approaching the second supporting member 737 with the lifting arm 731, the first movable arm 732 and the second movable arm 733 driven by the arm driving unit 730. The window regulator 523 may be of a manual type such that the arm driving unit 730 can be manually driven.

On the other hand, to the arm driving unit 730 an end portion of a cable C as a restiform member (see FIGS. 11 to 13) is latched. Another end portion of the cable C is, as will be described in detail, latched to a part of the restricting unit 540. The arm driving unit 730 is activated to draw in the cable C. More specifically, the arm driving unit 730 draws in the cable C when the arm driving unit 730 drives down the window glass 522 which is at the upper dead end. When the arm driving unit 730 is to drive up the window glass 522, the cable C is freed.

Figure 10:
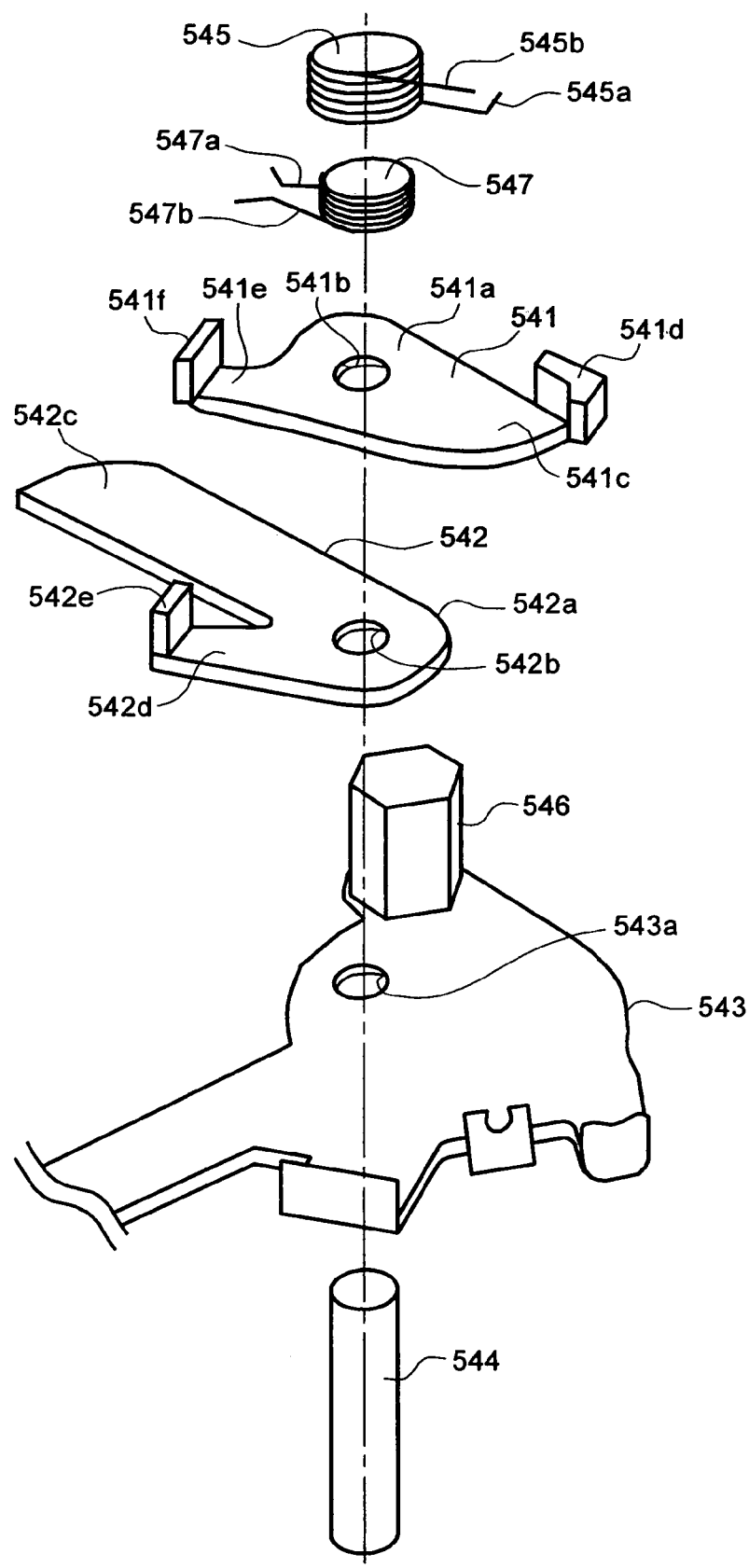
FIG. 10 is an exploded perspective view of structural elements of a restricting unit included in the sliding door apparatus shown in FIG. 9.
Figure 11:
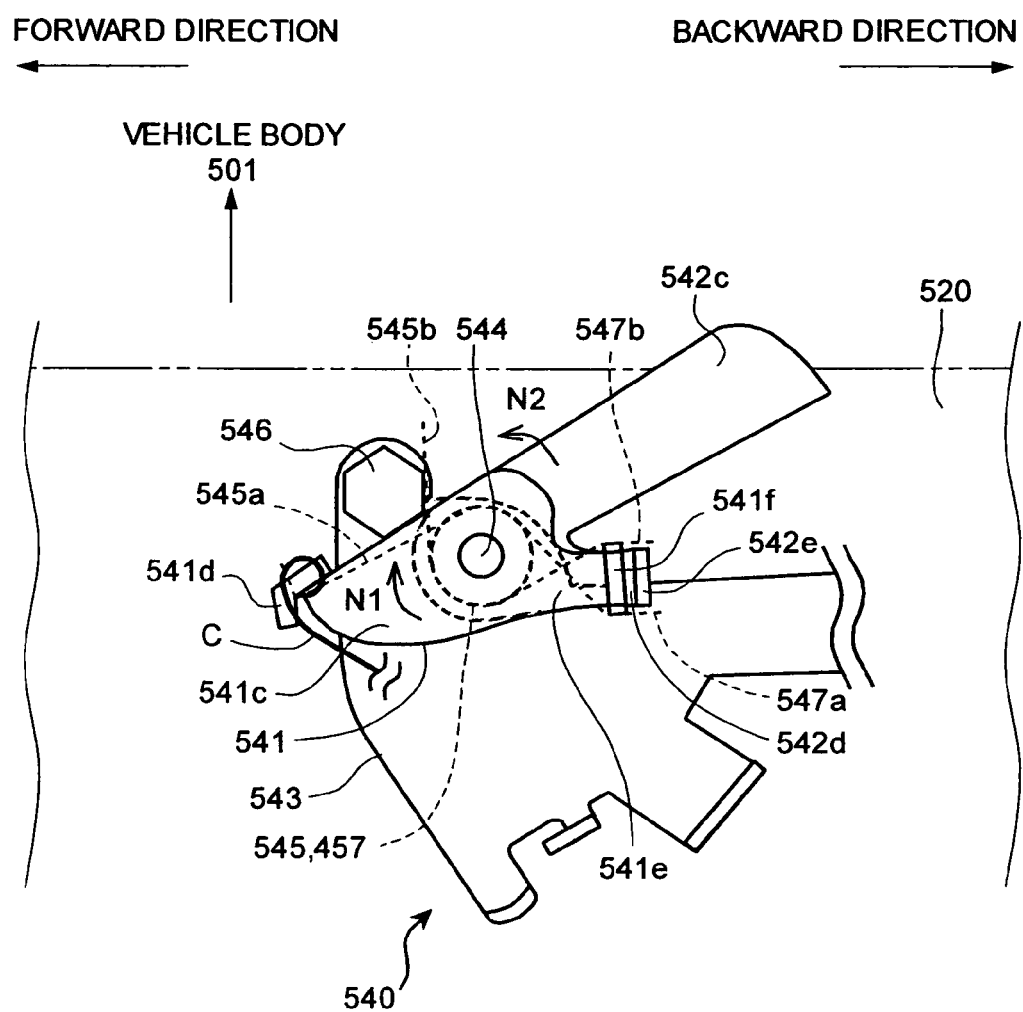
FIG. 11 is a sectional view of the structural elements in an operational state of the restricting unit.
Figure 12:
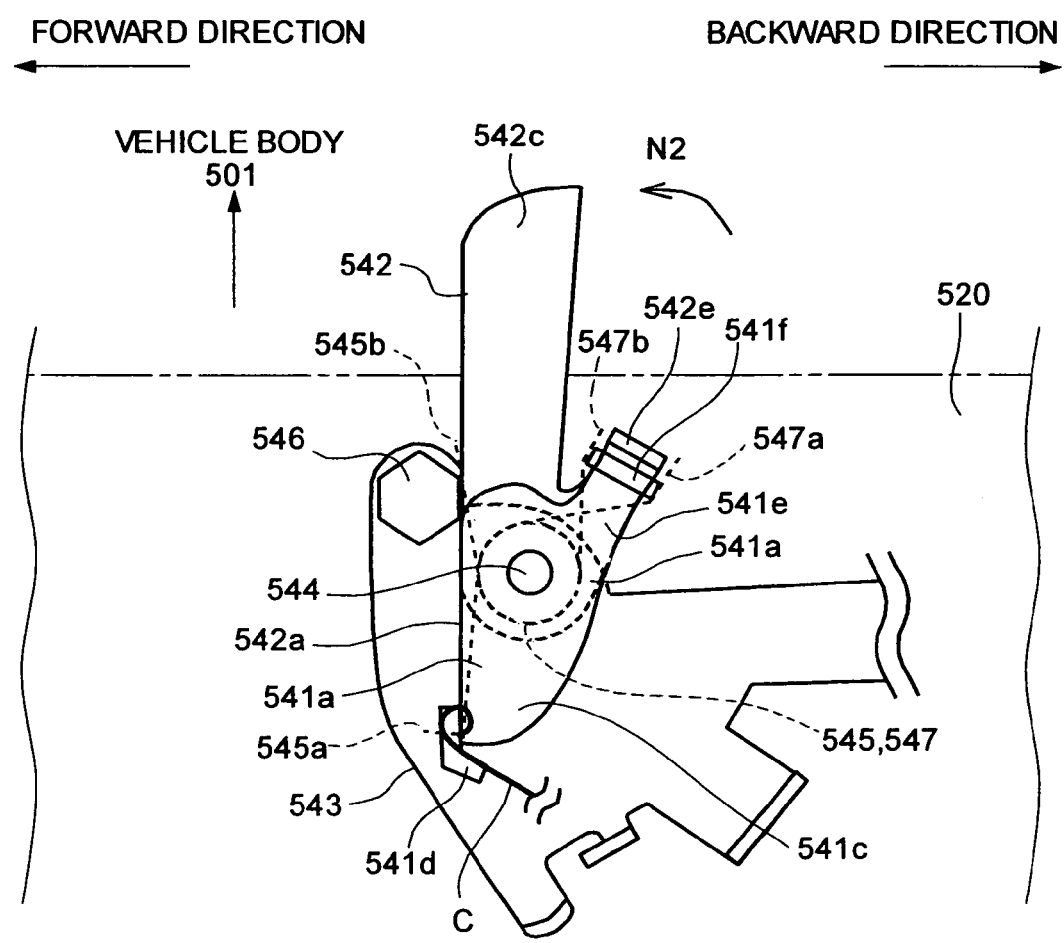
FIG. 12 is a sectional view of the structural elements representing another operational state of the restricting unit.
Figure 13:
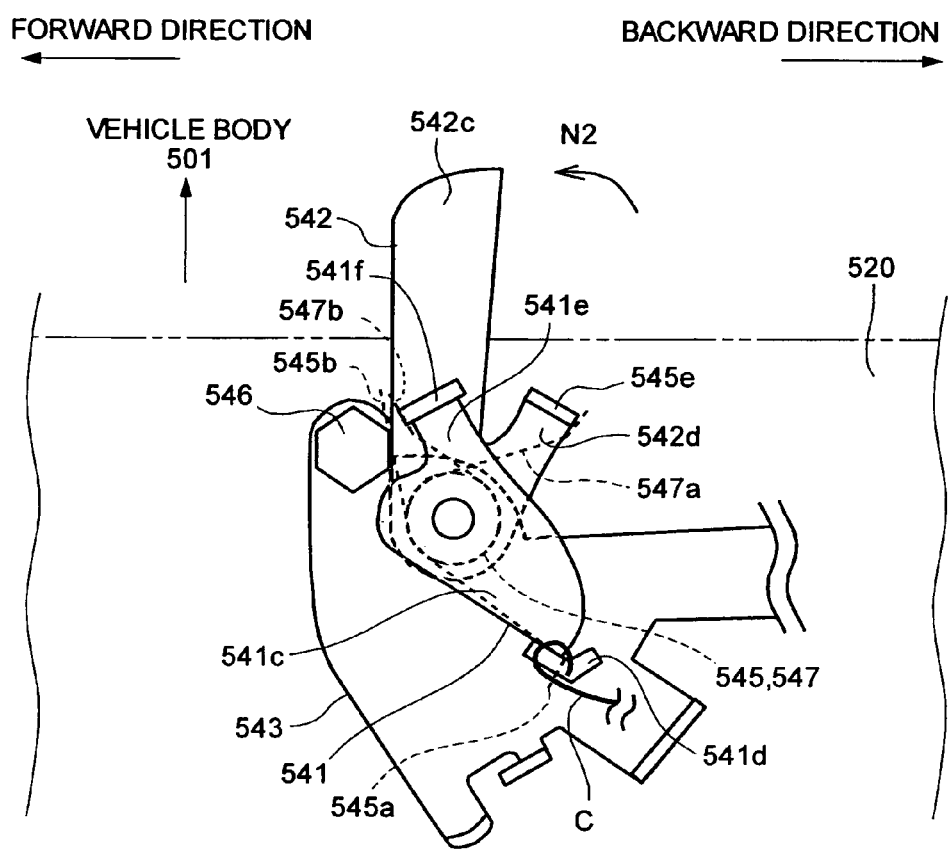
FIG. 13 is a sectional view of the structural elements in still another operational state of the restricting unit.

The restricting unit 540 is disposed at a lower portion of the sliding door 520. More specifically, the restricting unit 540 is supported by a fixed bracket (not shown) provided at a predetermined position in the lower portion of the sliding door 520. FIGS. 10 to 13 are illustrations of elements of the restricting unit of the sliding door apparatus according to the third embodiment. FIG. 10 is an exploded perspective view of the elements, and FIGS. 11 to 13 are cross sections of the elements in different operational states of the restricting unit. In FIGS. 10 to 13, the restricting unit 540 includes a first movable member 541 and a second movable member 542.

The first movable member 541 is disposed swingably on a base plate 543 of the fixed bracket. To be more specific, a supporting rod 544 inserted in a hole 543*a* of the base plate 543 is inserted in a through hole 541*b* at a proximal portion 541*a* of the first movable member 541 such that the first movable member 541 is able to swing about the axial center of the supporting rod 544.

To a first latch piece 541*d* at an end portion 541*c* of the first movable member 541, another end portion of the cable C is latched. That is, the first movable member 541 is mechanically connected with the arm driving unit 730 via the cable C. Further, to this first latch piece 541*d* one end portion 545*a* of a first coil spring 545 is latched. The first coil spring 545 is wound around the supporting rod 544, and another end portion 545*b* of the first coil spring 545 is latched to a stopper rod 546 fixed to the base plate 543. The first coil spring 545 applies a force on the first movable member 541 in a direction of an arrow N1 in FIG. 11 (clockwise direction), and a side edge of the base part 541*a* abuts on the stopper rod 546.

The second movable member 542 is disposed on the base plate 543 so as to be able to swing, between the base plate 543 and the first movable member 541. To be more specific, the supporting rod 544 is inserted in a through hole 542*b* at a base portion 542*a* of the second movable member 542 such that the second movable member 542 is able to swing and the end portion 542*c* is able to move toward/away from the vehicle body 501.

To a second latch piece 541*f* located at a protrusion 541*e* which protrudes from the base portion 541*a* of the first movable member 541, and a spring latch piece 542*e* located at a protrusion 542*d* which protrudes from the base part 542*a* of the second movable member 542, one end portion 547*a* and another end portion 547*b* of a second coil spring 547 are latched. The second coil spring 547 is wound around the supporting rod 544 similarly to the first coil spring 545. Positional relationship between the first movable member 541 and the second movable member 542 is defined such that by the force applied by the second coil spring 547 the protrusions 541*e* and 542*d* (the second latch piece 541*f* and the spring latch piece 542*e*) are overlapped with each other. Therefore, in a normal state of the second movable member 542, the protrusion 542*d* is overlapped with the protrusion 541*e* of the first movable member 541 (See FIG. 11). As is the same with the first movable member 541, the first coil spring 545 applies a force on the second movable member 542 in the direction of the arrow N1 in FIG. 11. Accordingly, in the normal state of the second movable member 542, the end portion 542*c* is retracted in relation to the vehicle body 501. In other words, the end portion 542*c* of the second movable member 542 is accommodated in the sliding door 520 indicated by a chain double-dashed line in FIG. 11.

Next, operation of the sliding door apparatus 510 will be explained. For convenience of explanation, the sliding door 520 is assumed to be fully closed initially.

When the window glass 522 is at the upper dead end and the window hole 521 is closed, the arm driving unit 730 of the window regulator 523 is not activated and does not draw in the cable C. Therefore, in the restricting unit 540, the first movable member 541 and the second movable member 542 are held at positions shown in FIG. 11 by the force in the direction of the arrow N1 applied by the first coil spring 545, with the side edge of the end portion 541*c* of the first movable member 541 abutting on the stopper rod 546. At this time, the end portion 542*c* of the second movable member 542 is retracted in relation to vehicle body 501. That is, the end portion 542*c* is accommodated in the sliding door 520. In other words, the second movable member 542 is positioned at a retracted position relative to the vehicle body 501. If the sliding door 520 is operated to fully open in such a state, the sliding door 520 slides in the backward direction of the vehicle body 501 to be fully opened.

On the other hand, he window glass 522 is moved down from the upper dead end, when the sliding door 520 is initially fully closed, the window hole 521 is also closed, and the window regulator 523 is driven by driving of the arm driving unit 730. The arm driving unit 730 draws in the cable C. The cable C is thus displaced by an amount corresponding to an extent to which the cable C is drawn in by the arm driving unit 730 (hereinafter also referred to as a "drawn-in amount"). By such displacement of the cable C, the restricting unit 540 is operated as described below.

As shown in FIG. 12, the first movable member 541 of the restricting unit 540 swings in the direction of the arrow N1 against the force applied by the first coil spring 545. As a result, since the protrusion 542d is overlapped with the protrusion 541e of the first movable member 541 by the force applied by the second coil spring 547, the second movable member 542 of the restricting unit 540 swings in the direction of an arrow N2 depending on the swinging motion of the first movable member 541 while keeping the overlapped state.

The side edge of the end portion 542c of the second movable member 542 having swung in the direction of the arrow N2 then abuts on the stopper rod 546 and stops swinging. At this time, the end portion 542c of the second movable member 542 is advanced in relation to the vehicle body 501. That is, the end portion 542c is protruded toward the vehicle body 501 from the sliding door 520 as denoted by the chain double-dashed line in FIG. 12. In other words, the second movable member 542 is positioned at an advanced position relative to the vehicle body 501. An amount of swinging from the retracted position to the advanced position of the second movable member 542 is associated in advance with an amount by which the window glass 522 is moved down from the upper dead end, namely with the openness of the window hole 521. When the openness of the window hole 521 exceeds a predetermined magnitude, the second movable member 542 is defined to be positioned at the advanced position.

When the sliding door 520 is operated to fully open when the second movable member 542 is at the advanced position, the sliding door 520 slides in the backward direction of the vehicle body 501. However, the end portion 542c of the second movable member 542 comes into abutment with an abutting block (not shown) arranged at a predetermined position of the vehicle body 501, so that the sliding door 520 is restricted from being fully opened. The abutting block is provided at such a position that the whole of the window hole 521 of the sliding door 520 can be prevented from crossing a pillar 504 of the vehicle body 501 (see FIG. 9) by sliding of the sliding door 520.

On the other hand, when the window glass 522 is moved up to the upper dead end to close the window hole 521, the arm driving unit 730 releases the cable C. It is assumed that the second movable member 542 of the restricting unit 540 here is at the advanced position as shown in FIG. 12 for convenience of the explanation. In the restricting unit 540, the first movable member 541 and the second movable member 542 swing in the direction of the arrow N1 by the force applied by the first coil spring 545. As a result, the second movable member 542 is positioned at the retracted position, and the end portion 542c of the second movable member 542 is retracted in relation to the vehicle body 501 (See FIG. 11).

As described above, in the second movable member 542, the amount of swinging from the retracted position to the advanced position is a total amount of swinging. In the restricting unit 540, product-to-product variation may cause variation in a relationship between the total amount of swinging and the draw-in amount of the cable C. Accordingly, to ensure that the end portion 542c of the second movable member 542 is advanced relative to the vehicle body 501, the draw-in amount of the cable C by the arm driving unit 730 (displacement of the cable C) is preferably larger than the total amount of swinging of the second movable member 542. Therefore, the draw-in amount of the cable C by the arm driving unit 730 is set to be larger than the total amount of swinging of the second movable member 542.

When the draw-in amount of the cable C by the arm driving unit 730 is larger than the total swinging amount of the second movable member 542, as shown in FIG. 13, the first movable member 541 of the restricting unit 540 swings in the direction of the arrow N2 in FIG. 13 against the force applied by the second coil spring 547, independently of the second movable member 542. At this time, the first movable member 541 swings until the protrusion 541e abuts on the stopper rod 546.

In summary, in the sliding door apparatus 510 according to the third embodiment of the present invention, the first movable member 541 and the second movable member 542 serve as the abutting portion to be abutted on the abutting block which is the predetermined portion of the vehicle body 501. The first coil spring 545 serves as the forcing unit, which applies the force on the second movable member 542 so as to hold the second movable member 542 at the retracted position relative to the vehicle body 501. The second coil spring 547 links the first movable member 541 and the second movable member 542 when the second movable member 542 swings from the retracted position to the advanced position, while serving as the permitting unit which permits the first movable member 541 to swing in relation to the second movable member 542 after the second movable member 542 has swung to the advanced position.

Further, the restricting unit 540 can be held at the retracted position relative to the vehicle body 501 as the first coil spring 545 applies the force on the first movable member 541 and the second movable member 542. The restricting unit 540 can be also held at the advanced position where the end portion 542c of the second movable member 542 is advanced relative to the vehicle body 501 against the force applied by the first coil spring 545 when the arm driving unit 730 draws in the cable C and the openness of the window hole 521 exceeds the predetermined magnitude. Therefore, even if the force by the first coil spring 545 is weakened due to adhesion of mud or water to the first coil spring 545, in the restricting unit 540, the end portion 542c of the second movable member 542 can be infallibly held at the advanced position relative to the vehicle body 501. Therefore, for fully opening the sliding door 520 in which the window hole 521 is opened by the openness exceeding the predetermined magnitude, the end portion 542c of the second movable member 542 can infallibly abut on the abutting block, so that the sliding door 520 can be infallibly restricted from being fully opened. Accordingly, even if the sliding door 520 is operated to fully open with an object passing through the window hole 521, the object will not be caught between the window frame of the window hole 521 and the pillar 504 of the vehicle body 501 and hence damages are prevented.

Furthermore, according to the sliding door apparatus 510, the second coil spring 547 on one hand links the first movable member 541 and the second movable member 542 when the second movable member 542 swings from the retracted position to the advanced position. On the other hand, the second coil spring 547 allows the first movable member 541 to swing in relation to the second movable member 542 after the second movable member 542 has swung to the advanced position. As a result, even if product-to-product variation causes variation in the relationship between the total swinging amount of the second movable member 542 and the draw-in amount of the cable C, the end portion 542c of the second movable member 542 can be infallibly brought to the advanced position relative to the vehicle body 501.

Although an example of preferred embodiments of the present invention has been described, it is to be understood that the present invention is not limited to this embodiment. For example, the openness of the window hole may be detected by a detector such as a sensor, and the cable may be drawn in according to a result of this detection.

Figure 14:
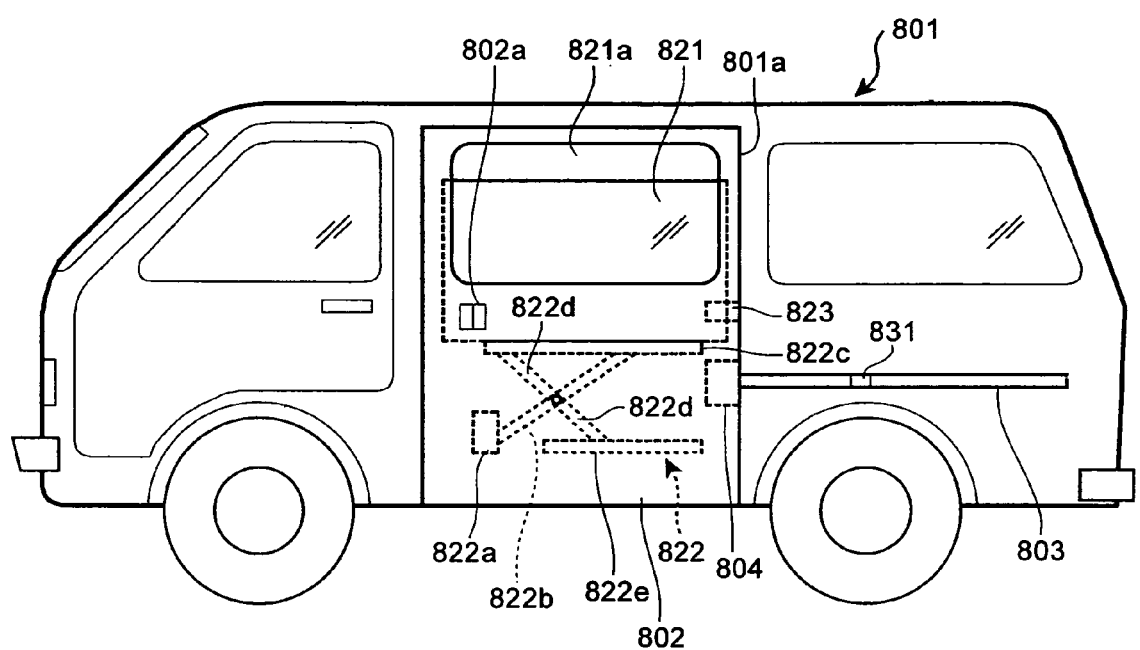
FIG. 14 is a side view of a vehicle body having a vehicle door apparatus according to a fourth embodiment of the present invention.

A vehicle door apparatus according to a fourth embodiment of the present invention as shown in FIG. 14 is applied to a sliding door 802 which is a door provided on a side of a vehicle body 801. The sliding door 802 is engaged with a rail 803 provided approximately parallel with the fore-and-aft direction of the vehicle body 801 on the side of the vehicle body 801. The sliding door 802 is slidably guided in the fore-and-aft direction of the vehicle body 801 along the rail 803 to open/close an opening 801a on the side of the vehicle body 801. In FIG. 14, the sliding door 802 is closed.

Figure 15:
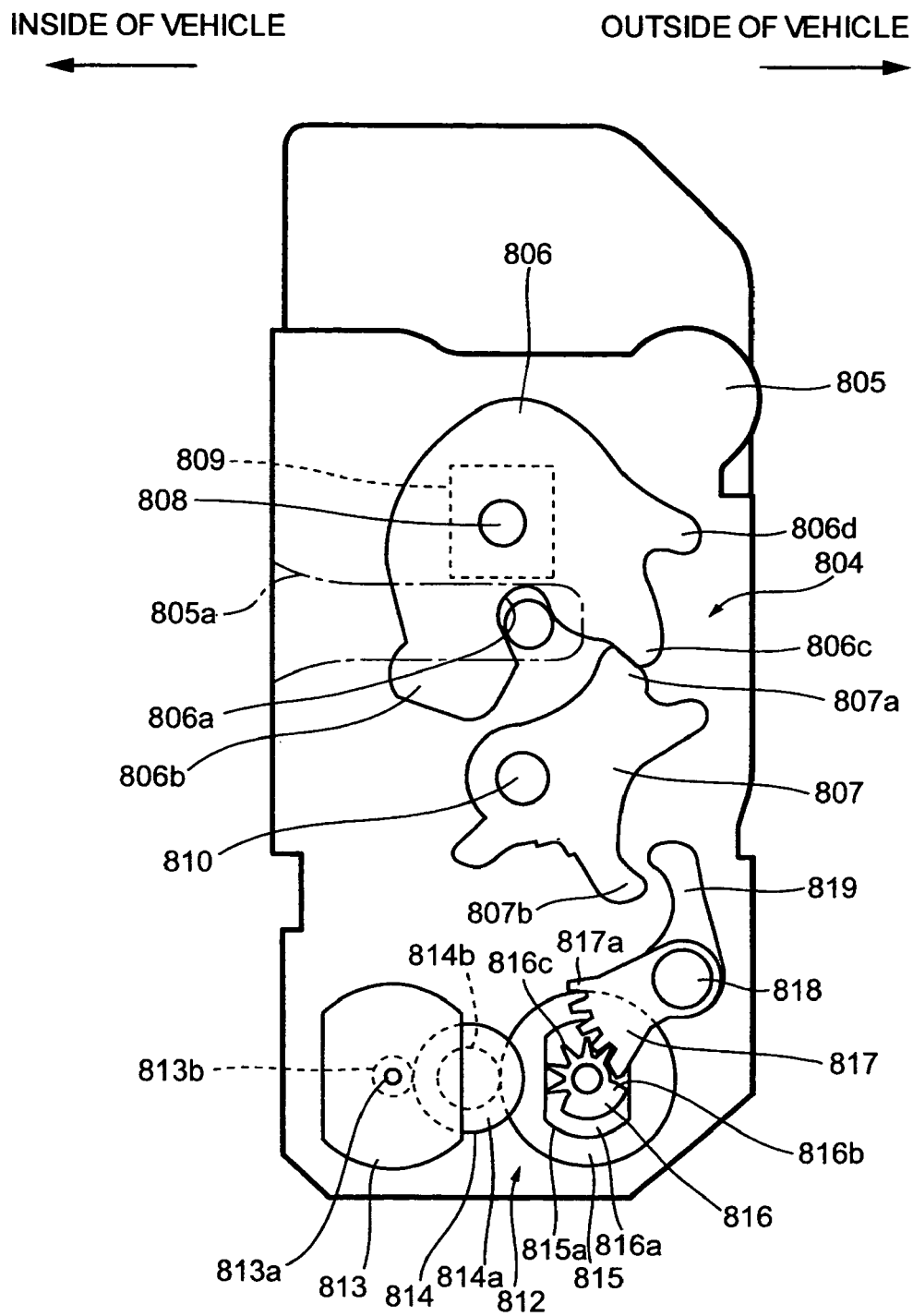
FIG. 15 is an illustration of a full closure latch unit viewed from a front side of the vehicle body.
Figure 16A:
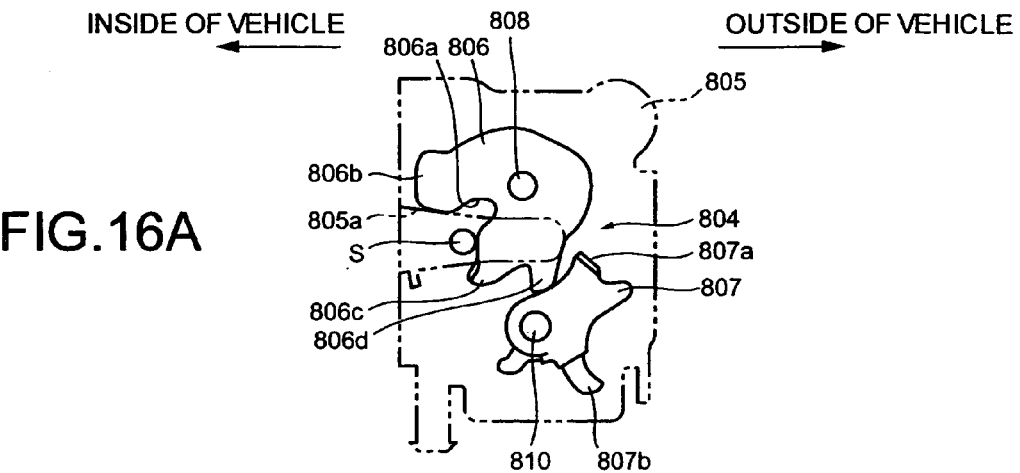
FIGS. 16A to 16C are illustrations of operations of the full closure latch unit.
Figure 16B:
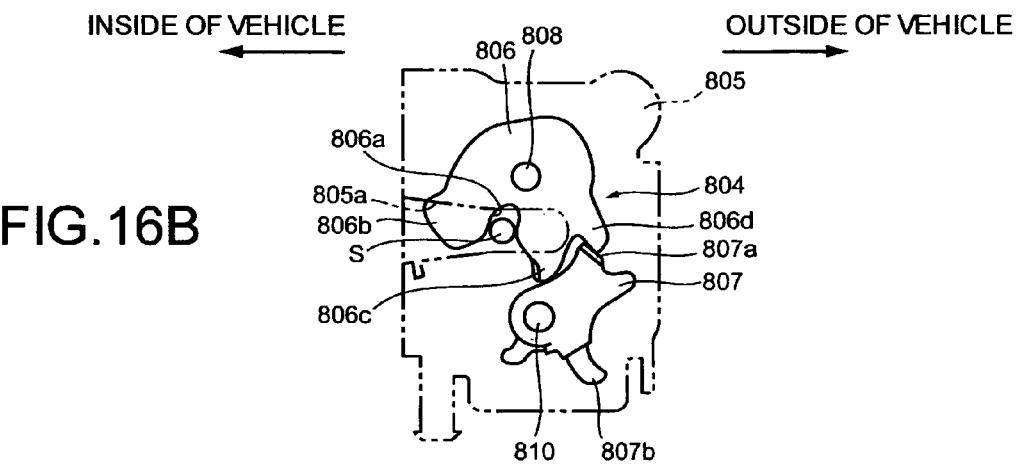
Figure 16C:
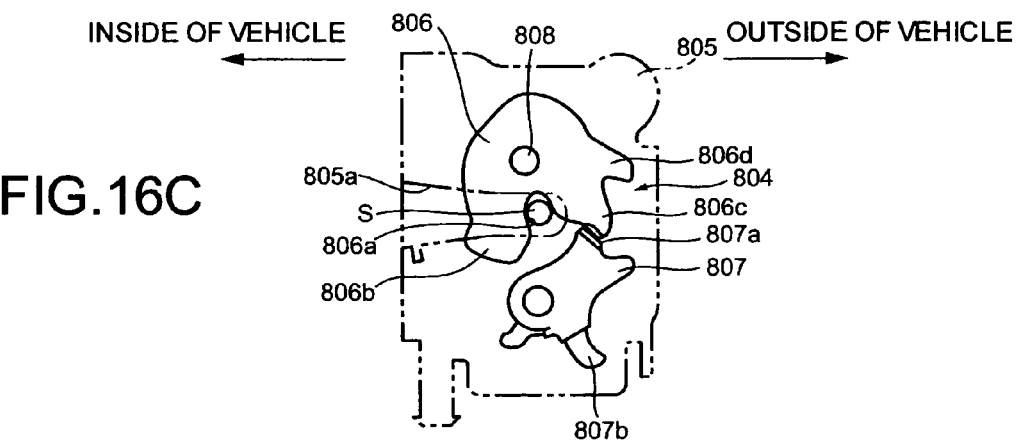

The vehicle body 801 and the sliding door 802 are provided with a full closure latch unit configured to bring the sliding door 802 into engagement with the vehicle body 801 so as to open/close the opening 801a. FIG. 15 is an illustration of the full closure latch unit viewed from the front of the vehicle body, and FIGS. 16A to 16C are conceptual views of operation of the full closure latch unit.

As shown in FIG. 15, the full closure latch unit has a latch mechanism unit 804 disposed at the sliding door 802. The latch mechanism unit 804 on one hand keeps the sliding door 802 closed by meshing with a striker S provided at the vehicle body 801. The latch mechanism unit 804 on the other hand permits the sliding door 802 to slide in the opening direction by releasing the striker S meshed. This latch mechanism unit 804 includes a latch 806 and a ratchet 807 in an accommodating unit 805. The accommodating unit 805 has a horizontal notch groove 805a extending from the interior to the exterior of the vehicle body 801, at an approximate midpoint of a height of the accommodating unit 805.

The latch 806 is rotatably provided via a latch axis 808 extending approximately horizontally along the fore-and-aft direction of the vehicle body 801, at a position higher than the horizontal notch groove 805a of the accommodating unit 805. The latch 806 has a meshing groove 806a, a hook 806b, a full-latch latching portion 806c, and a half-latch latching portion 806d along a circumference of the latch 806.

The meshing groove 806a is formed from an outer peripheral surface of the latch 806 toward the latch axis 808 and has a width which can accommodate the striker S. The hook 806b is a part located closer to the interior of the vehicle body 801 than the meshing groove 806a when the meshing groove 806a is opened downward. The full-latch latching portion 806c is located closer to the exterior of the vehicle body 801 than the meshing groove 806a when the meshing groove 806a is opened downward. The half-latch latching portion 806d is located toward the exterior and diagonally downward when the meshing groove 806a is opened diagonally downward toward the interior of the vehicle body 801.

The latch 806 is always applied with a force in the clockwise direction in FIG. 15 by a member such as a spring member (not shown).

The latch axis 808 has a latch detector 809. The latch detector 809 detects a position of the latch 806 based on rotation of the latch axis 808 due to rotation of the latch 806.

The ratchet 807 is rotatably provided at a position lower than the horizontal notch groove 805a of the accommodating unit 805 so that the ratchet 807 can rotate via a ratchet axis 810 extending approximately horizontally along the fore-and-aft direction of the vehicle body 801. The ratchet 807 has an engaging portion 807a and a power action unit 807b along a circumference of the ratchet 807.

The engaging portion 807a extends in the radial direction from the ratchet axis 810 toward the exterior of the vehicle body 801. When the ratchet 807 is rotated in the clockwise direction in FIG. 15, the engaging portion 807a can engage with the full-latch latching portion 806c and the half-latch latching portion 806d of the latch 806 described above via a projecting end surface of the engaging portion 807a. The power action unit 807b extends in the radial direction toward the exterior of the vehicle body 801 from the ratchet axis 810.

The above ratchet 807 is always applied with a force in the counterclockwise direction in FIG. 15 by a member such as a spring member (not shown).

The ratchet 807 is linked with an outside handle 802a disposed on the exterior side of the sliding door 802 or an inside handle disposed on the interior side of the sliding door 802, and rotates in the clockwise direction against the force applied by the spring member by an operation through the handle. The configuration for linking the outside handle 802a and the inside handle with the ratchet 807 is the same as that previously described, and so the explanation will be omitted.

In the latch mechanism unit 804, the latch 806 rotates in the clockwise direction by the force as shown in FIG. 16A when the sliding door 802 is opened in relation to the vehicle body 801. In this case, an unlatched state is established in which the hook 806b releases the horizontal notch groove 805a so as to allow the striker S to advance/retract (be removed) to/from the horizontal notch groove 805a. If the sliding door 802 is operated to close from the unlatched state, the striker S provided at the vehicle body 801 enters the horizontal notch groove 805a, so that the striker S abuts on the full-latch latching portion 806c. As a result, the latch 806 rotates in the counterclockwise direction against the clockwise force while the ratchet 807 rotates about the axial center of the ratchet axis 810 according to the shape of the outer peripheral surface of the latch 806 as the projecting end surface of the engaging portion 807a slides in contact with the outer peripheral surface of the latch 806.

When the sliding door 802 is further operated to close from the state as described above, the striker S enters further into the horizontal notch groove 805a gradually to cause the latch 806 to further rotate in the counterclockwise direction, and then the engaging portion 807a of the ratchet 807 reaches to the half-latch latching portion 806d of the latch 806 as shown in FIG. 16B. In this state, since the half-latch latching portion 806d is abutted on the engaging portion 807a, rotation in the clockwise rotation of the latch 806 by the force is inhibited. In addition, since the hook 806b of the latch 806 is arranged to traverse the horizontal notch groove 805a, the striker S is prevented from moving in the direction of leaving the horizontal notch groove 805a, or the sliding door 802 is prevented from opening in relation to the vehicle body 801 by the hook 806*b*. As a result, the sliding door 802 is latched to the vehicle body 801 and kept in a half-door state (half latch position).

When the sliding door 802 is further operated to close from the aforementioned half-latch state, the latch 806 is rotated further in the counterclockwise direction via the full-latch latching portion 806*c* by the striker S entering the horizontal notch groove 805*a*, and the striker S reaches the end (the exterior side of the vehicle body) of the horizontal notch groove 805*a*. During this motion, the outer peripheral surface connecting the half-latch latching portion 806*d* and the full-latch latching portion 806*c* of the latch 806 slides in contact with a top surface of the engaging portion 807*a* so that the ratchet 807 is rotated in the clockwise direction in FIG. 16 against the force and begins to rotate in the counterclockwise direction immediately after the full-latch latching portion 806*c* of the latch 806 has passed the ratchet 807. As a result, as shown in FIG. 16C, since the full-latch latching portion 806*c* of the latch 806 comes into abutment with the engaging portion 807*a* of the ratchet 807, clockwise rotation of the latch 806 by the force is prevented. In this state, since the hook 806*b* is arranged so as to traverse the horizontal notch groove 805*a*, the striker S is prevented from moving in the direction of leaving the end of the horizontal notch groove 805*a* by the hook 806*b*, so that the sliding door 802 is latched to the vehicle body 801 and kept in a full closed state (full latch position). In the fourth embodiment, a term "closed state" includes the "half-door state" in which the latch mechanism unit 804 is at the half latch position and the "full closed state" in which the latch mechanism unit 804 is at the full latch position.

At the full latch position or the half latch position, when the outside handle 802*a* or the inside handle (not shown) is operated, the ratchet 807 rotates in the clockwise direction in FIG. 16 against the force. As a result, the full-latch latching portion 806*c* (or the half-latch latching portion 806*d*) of the latch 806 is released from abutting engagement with the engaging portion 807*a* of the ratchet 807, and the latch 806 is rotated in the clockwise direction in FIG. 16 by the force. As a result, as shown in FIG. 16A, the horizontal notch groove 805*a* is released so as to allow the striker S to move in the direction of leaving the horizontal notch groove 805*a*, so that the sliding door 802 is ready to be operated to open in relation to the vehicle body 801.

The unlatched state, full latch position, or half latch position as described above is detected by the latch detector 809 serving as a door detector provided at the latch axis 808.

As shown in FIG. 15, the accommodating unit 805 accommodating the latch mechanism unit 804 is provided with a door releasing mechanism 812 serving as a latch releasing unit of the full closure latch unit. The door releasing mechanism 812 has a motor 813, an idling gear 814, a first transmission gear 815, a second transmission gear 816, a sector gear 817, a lever shaft 818, and a releasing lever 819.

The motor 813 is configured so that an output axis 813*a* is rotatable in both the clockwise and counterclockwise directions in FIG. 15. To the output axis 813*a* a driving gear 813*b* is attached.

The idling gear 814 is rotatably attached to the accommodating unit 805. The idling gear 814 has a large-diameter gear wheel 814*a* configured to mesh with a driving gear 813*b* of the motor 813 and a small-diameter gear wheel 814*b*, which are formed coaxially and may be unitary.

The first transmission gear 815 is rotatably attached to the accommodating unit 805. The first transmission gear 815 has a toothed outline configured to mesh with the small-diameter gear wheel 814*b* of the idling gear 814. The first transmission gear 815 has a recess 815*a* at a center portion of the first transmission gear 815.

The second transmission gear 816 has a flange 816*a* that fits in the recess 815*a* of the first transmission gear 815, and is attached coaxially to the first transmission gear 815. The second transmission gear 816 includes a fan-shaped projection 816*b* extending in the radial direction with respect to the axis of the second transmission gear 816 and a gear 816*c* at the projection 816*b*.

The sector gear 817 is rotatably attached to the accommodating unit 805 by the lever shaft 818. The sector gear 817 includes a gear 817*a* that meshes with the gear 816*c* of the second transmission gear 816.

The releasing lever 819 is rotatably attached to the accommodating unit 805 by the lever shaft 818. The releasing lever 819 is configured to be engageable with the power action unit 807*b* of the ratchet 807.

According to the above door releasing mechanism 812, the power generated by the motor 813 is transmitted sequentially to the driving gear 813*b*, the idling gear 814, the first transmission gear 815, the second transmission gear 816, the sector gear 817, the lever shaft 818, and the releasing lever 819. The releasing lever 819 is then swung in the counterclockwise direction in FIG. 15. When the releasing lever 819 swings in the counterclockwise direction in FIG. 15, the ratchet 807 swings in the clockwise direction in FIG. 15 to cancel the engagement between the ratchet 807 and the latch 806 at the full latch position and the half latch position. In this manner, the door releasing mechanism 812 rotates the ratchet 807 by the power of the motor 813 to bring the latch 806 into the unlatched state. In other words, the door releasing mechanism 812 permits the sliding door 802 to slide in the opening direction.

As shown in FIG. 14, the sliding door 802 is provided with a window hole 821. The window hole 821 allows opening/closing of a window hole opening 821*a* provided in the sliding door 802. Opening/closing of the window hole 821 is achieved by a regulator 822. In the fourth embodiment, a power window regulator of an X-arm type is used as the regulator 822 as an example. In this case, the regulator 822 drives the lifting arm 822*b* to be swung with an arm driving unit 822*a* having a motor or the like. A swinging end of the lifting arm 822*b* is movably engaged along a longitudinal supporting member 822*c* fixed to a lower end portion of the window hole 821. The lifting arm 822*b* has a pair of movable arms 822*d* at a midway portion of the lifting arm 822*b*. A proximal end of one of the movable arms 822*d* is supported at a first position by the lifting arm 822*b* and a distal end of the movable arm 822*d* is movably engaged along the longitudinal supporting member 822*c*. A proximal end of another one of the movable arms 822*d* is supported coaxially with respect to the first position, and a distal end of the another one of the movable arms 822*d* is movably engaged with a supporting member 822*e* fixed approximately in parallel with the supporting member 822*c* to the sliding door 802. That is, for opening the window hole 821, the regulator 822 drives the arm driving unit 822*a* to cause the lifting arm 822*b* and the respective movable arms 822*d* to displace the supporting member 822*c* downward in relation to the supporting member 822*e*. For closing the window hole 821, the regulator 822 drives the arm driving unit 822*a* to cause the lifting arm 822*b* and the respective movable arms 822*d* to displace the supporting member 822*c* upward in relation to the supporting member 822*e*.

The above regulator 822 may be of a type configured to be able to manually drive the arm driving unit 822*a*.

The fact that the window hole 821 is opened by the regulator 822 may be detected by a window hole detector 823. The window hole detector 823 may be of any type, such as a type configured to detect moving down of the window hole 821 or a type configured to detect downward driving of the regulator 822. The window hole detector 823 may detect that the window hole 821 is open according to an operation of an opening switch of a power window, if the regulator 822 is of an automatic power window.

Next, control for preventing closing of the window hole 821 that has been opened by the regulator 822 from being forgotten is explained.

Figure 17:
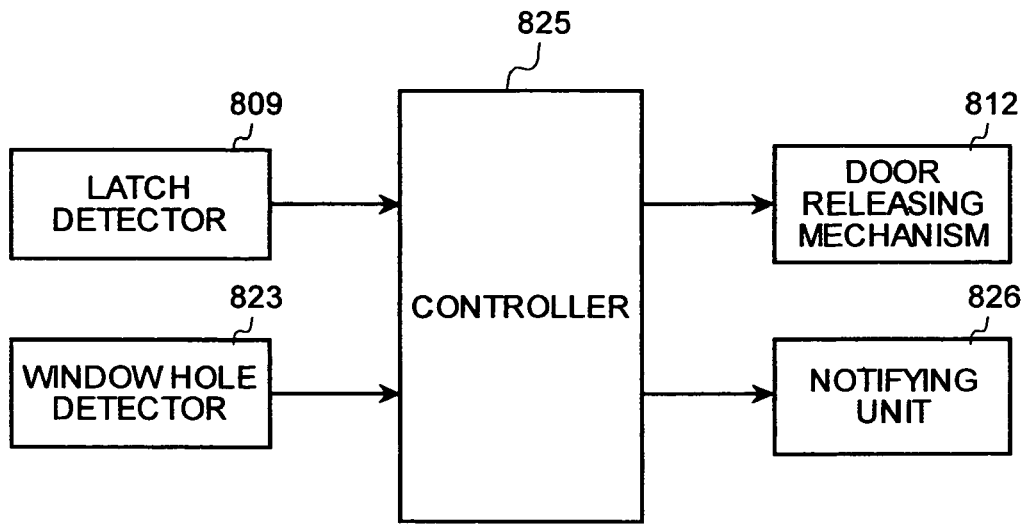
FIG. 17 is a block diagram of a controller.

FIG. 17 is a block diagram of a controller that prevents the closing of the window hole from being forgotten. A controller 825 includes a processor (such as a CPU), a RAM for storing input data, and a ROM for storing control procedure. To the controller 825, the latch detector 809, the window hole detector 823, the door releasing mechanism 812, and a notifying unit 826 are connected. In the fourth embodiment, the latch detector 809 detects the operational state of the full closure latch unit only from the position of the latch 806. However the operational state of the full closure latch unit may be detected from the position of the ratchet 807.

The controller 825 receives a detection signal from the latch detector 809 having detected the position of the latch 806 in the latch mechanism unit 804 (the unlatched state, half latch position, and full latch position). Also the controller 825 receives a detection signal from the window hole detector 823 having detected that the window hole 821 is opened by the regulator 822. The controller 825 outputs a driving signal for rotating the ratchet 807 of the latch mechanism unit 804 to the door releasing mechanism 812. The controller 825 then outputs a driving signal to the notifying unit 826 for notifying a user/passenger with a sound, light, or the like.

Figure 18:
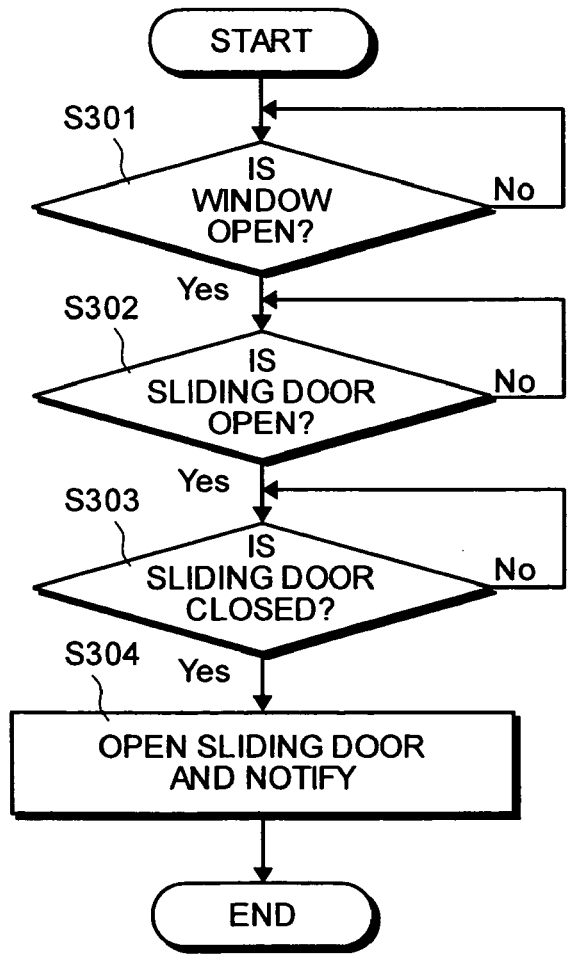
FIG. 18 is a flow chart of processes executed by the controller.

FIG. 18 is a flowchart of control for preventing closing of the window hole from being forgotten. First, when the window hole 821 is detected to be open (step S301: Yes) and the sliding door 802 is detected to be open (step S302: Yes), these two results of detection are stored. When the sliding door 802 is placed in the closed state (step S303: Yes), the door releasing mechanism 812 is activated to close the door, so that the latch 806 is brought into the unlatched state and the closed state of the sliding door 802 is cancelled, the notifying unit 826 notifies the user (step S304), and the control is ended.

In step S302, the opened state of the sliding door 802 can be determined by detecting the unlatch state with the latch detector 809 serving as the door detector. In step S303, the closing operation of the sliding door 802 can be determined by detecting the half latch position or the full latch position with the latch detector 809 serving as the door detector. Step S301 may be performed after step S302 instead. If the window hole 821 is closed after ending the control, the sliding door 802 can be closed.

When the window hole 821 is open (step S301: Yes) and the sliding door 802 is open (step S302: Yes), instead of proceeding to step S303, the controller 825 may activate the door releasing mechanism 812 so as to open the sliding door 802, notify the user (step S304), and end the control.

The vehicle door apparatus may have in the full closure latch unit an auto-closer function that drives the latch 806 to the full latch position upon detection of the half latch position by the latch detector 809, for closing the sliding door 802. Such an auto-closer function is cancelled so as not to be activated when the window hole 821 and the sliding door 802 are open (after steps S301 and S302).

As described above, the vehicle door apparatus has a door closure preventing unit configured to prevent the sliding door 802 from being closed. This door closure preventing unit includes the window hole detector 823 that detects the open state of the window hole 821, the door detector (the latch detector 809) that detects the open state of the sliding door 802, the full closure latch unit (the latch mechanism unit 804 and the door releasing mechanism 812), and the controller that activates the full closure latch unit so as to open the door based on detection signals input from the window hole detector and the door detector. Accordingly, when the sliding door 802 is open while the window hole 821 is also open, the door closure preventing unit activates the full closure latch unit to open the door, so as to prevent the sliding door 802 from being closed. As a result, the passenger is able to recognize that he/she has forgotten to close the window hole 821, and the passenger is prevented from leaving the vehicle with the window hole 821 open.

Further, the notifying unit 826 notifies the passenger so as to allow the passenger to recognize clearly that the passenger has forgotten to close the window hole 821.

The fourth embodiment has been described with the door closure preventing unit which prevents the sliding door 802 from being closed using the door releasing mechanism 812 when the sliding door 802 and the window hole 821 are open. However, the door closure preventing unit may be of a type, which prevents the sliding door 802 from being closed without using the door releasing mechanism 812.

Figure 19:
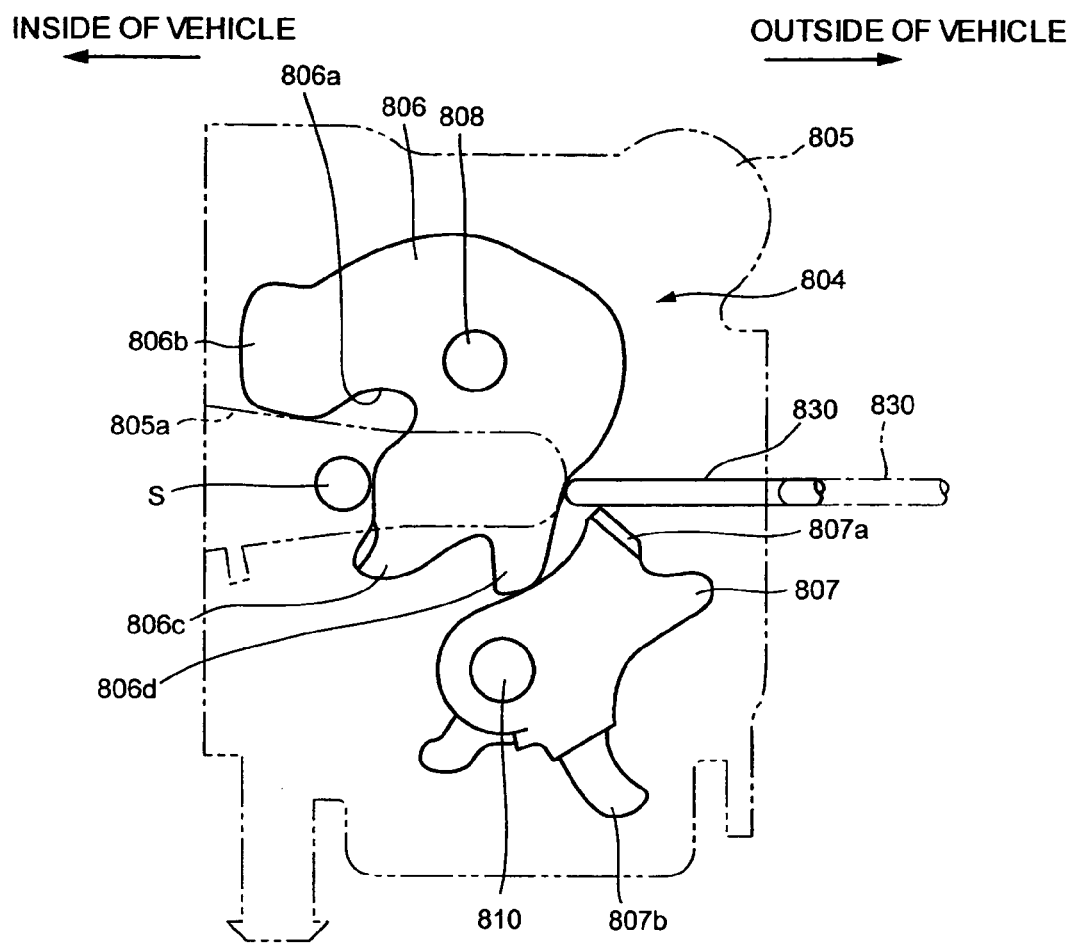
FIG. 19 is an illustration of a full closure latch unit according to another embodiment of the present invention.

More specifically, as shown in FIG. 19, the latch mechanism unit 804 may be provided with a restricting rod 830 configured to abut on the latch 806 in the unlatched state so as to disable the latch 806 in the unlatched state to rotate to the half latch position and full latch position. The restricting rod 830 is able to move to/from the latch 806 via a link mechanism, an actuator, or the like (not shown). When the window hole detector 823 determines that the window hole 821 is open and the latch detector 809 determines that the sliding door 802 is open, the restricting rod 830 is advanced toward the latch 806 (from the position indicated by the dashed dotted line to the position indicated by the solid line) in FIG. 19 so as to restrict counterclockwise rotation of the latch 806 and keep the latch mechanism unit 804 in the unlatched state.

The rail 803 may have a restricting member 831 that abuts on the sliding door 802 as shown in FIG. 14 so that the sliding door 802 open is not closed. The restricting member 831 is able to advance/retract to/from the rail 803 via a link mechanism or an actuator (not shown). When the window hole detector 823 detects that the window hole 821 is open and the latch detector 809 detects the sliding door 802 is open, the restricting member 831 is caused to advance into the rail 803 to restrict the sliding door 802 from closing, such that the latch mechanism unit 804 is kept in the unlatched state.

According to the vehicle door apparatus, it is possible to prevent the sliding door 802 from being closed when the sliding door 802 is open and the window hole 821 is open, so that the passenger is able to recognize that she/he has forgotten to close the window hole 821 and the passenger is prevented from closing the door with the window hole open.

In the fourth embodiment, the latch detector 809 determines the sliding door 802 to be open by detecting the unlatched state, but this may be determined by ON/OFF of a switch or the like serving as the door detector that directly detects opening of the sliding door 802.

Further, the embodiment is not limited to be utilized in the sliding door 802, but may be also applied to any other door having an openable/closable window hole such as a side door that opens via a hinge, or a back door of hatchback vehicle body, so as to prevent the passenger from forgetting to close the window hole.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A sliding door apparatus comprising:
   a sliding door having a window hole and configured to be slidable with respect to a vehicle body;
   an opening/closing member configured to open and close the window hole;
   a window hole openness detector configured to detect a position of the opening/closing member relative to the window hole so as to determine an openness of the window hole;
   a door position detector configured to detect a position of the sliding door relative to the vehicle body; and
   a slide restricting unit configured to be activated to project from one to another one of the vehicle body and the sliding door, so as to abut on the another one such that the sliding door is stopped from sliding in a direction toward which the sliding door is opened relatively to the vehicle body, when the openness determined by the window hole openness detector is greater than a threshold, and the position of the sliding door is detected to be between a full-closed position and a midway position.

2. A sliding door apparatus comprising:
   a sliding door configured to be slidable with respect to a vehicle body;
   a door speed detector configured to detect a speed of the sliding door at least when the sliding door slides in a direction toward which the sliding door is opened; and
   a braking unit configured to brake down the sliding door when the speed detected is greater than a threshold, further comprising:
   a door position detector configured to detect a position of the sliding door relative to the vehicle body; and
   a slide restricting unit configured to be activated to project from one to another one of the vehicle body and the sliding door, so as to abut on the another one such that the sliding door is stopped from sliding in a direction toward which the sliding door is opened relatively to the vehicle body, when the sliding door is located between a full-closed position and a midway position,
   wherein the braking unit is configured to brake down the sliding door after the slide restricting unit is activated but before the sliding door is stopped from sliding by the slide restricting unit.

* * * * *